(12) United States Patent
Lam et al.

(10) Patent No.: US 12,586,131 B2
(45) Date of Patent: Mar. 24, 2026

(54) METHOD AND SYSTEM FOR COVARIANCE MATRIX ESTIMATION

(71) Applicant: JPMorgan Chase Bank, N.A., New York, NY (US)

(72) Inventors: Jessica Lam, Piedmont, CA (US); Chak Kei Jack Wong, Hong Kong (HK); Yirui Liu, London (GB)

(73) Assignee: JPMORGAN CHASE BANK, N.A., New York, NY (US)

( * ) Notice: Subject to any disclaimer, the term of this patent is extended or adjusted under 35 U.S.C. 154(b) by 1059 days.

(21) Appl. No.: 17/449,850

(22) Filed: Oct. 4, 2021

(65) Prior Publication Data

US 2023/0108963 A1    Apr. 6, 2023

(51) Int. Cl.
*G06Q 40/06* (2012.01)
*G06Q 40/04* (2012.01)

(52) U.S. Cl.
CPC .................................... *G06Q 40/06* (2013.01)

(58) Field of Classification Search
None
See application file for complete search history.

(56) References Cited

U.S. PATENT DOCUMENTS 7,707,091 B1    4/2010  Kauffman et al.
2003/0115128 A1 *   6/2003  Lange .................... G06Q 40/04
705/37

(Continued)

FOREIGN PATENT DOCUMENTS

WO    WO 2012/116309 A2    8/2012
WO    WO-2015094545 A1 *   6/2015  ............. G06Q 40/06

OTHER PUBLICATIONS

Apostolos-Paul N. Refenes, A. Neil Burgess, and Yves Bentz, "Neural Networks in Financial Engineering: A Study in Methodology", IEEE Transactions on Neural Networks, vol. 8, No. 6, Nov. 1997, pp. 1222-1267 (Year: 1997).*

(Continued)

*Primary Examiner* — Matthew S Gart
*Assistant Examiner* — Irene S Kang
(74) *Attorney, Agent, or Firm* — Greenblum & Bernstein, P.L.C.

(57) ABSTRACT

A method for estimating a covariance with respect to a plurality of bonds is provided. The method includes: receiving historical bond market returns data; using a first algorithm based on an Auto-Regressive-Moving-Average (ARMA) model to calculate ARMA model regression errors based on the historical bond market data; using a second algorithm based on a logarithmic Generalized AutoRegressive Conditional Heteroskedasticity (GARCH) model to calculate an estimated volatility vector based on the ARMA model regression errors; using the ARMA model regression errors and the calculated volatility vector to estimate a time-varying covariance matrix of the ARMA model regression errors with respect to the historical bond market data; using the estimated time-varying covariance matrix of the ARMA model regression errors and the calculated volatility vector to estimate a time-varying covariance matrix of the bond returns; and using the estimated time-varying covariance matrix to calculate a set of predicted hedge ratios.

14 Claims, 17 Drawing Sheets

(56) References Cited

U.S. PATENT DOCUMENTS

| | | |
|---|---|---|
| 2014/0114881 A1 | 4/2014 | Meucci |
| 2018/0330447 A1* | 11/2018 | Slotterback ............ G06Q 40/06 |

OTHER PUBLICATIONS

Neural networks in financial engineering (Year: 1997).*

International Search Report and Written Opinion in corresponding International Application No. PCT/US2022/045553, dated Feb. 7, 2023.

* cited by examiner

400

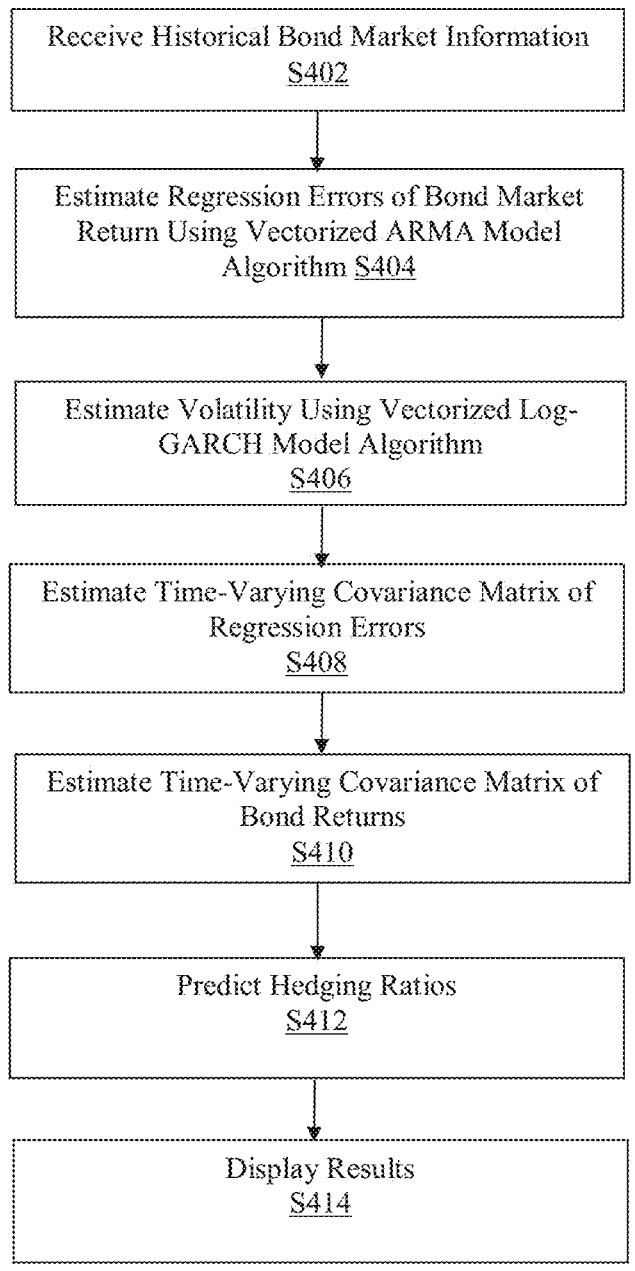

Receive Historical Bond Market Information
S402

Estimate Regression Errors of Bond Market
Return Using Vectorized ARMA Model
Algorithm S404

Estimate Volatility Using Vectorized Log-
GARCH Model Algorithm
S406

Estimate Time-Varying Covariance Matrix of
Regression Errors
S408

Estimate Time-Varying Covariance Matrix of
Bond Returns
S410

Predict Hedging Ratios
S412

Display Results
S414

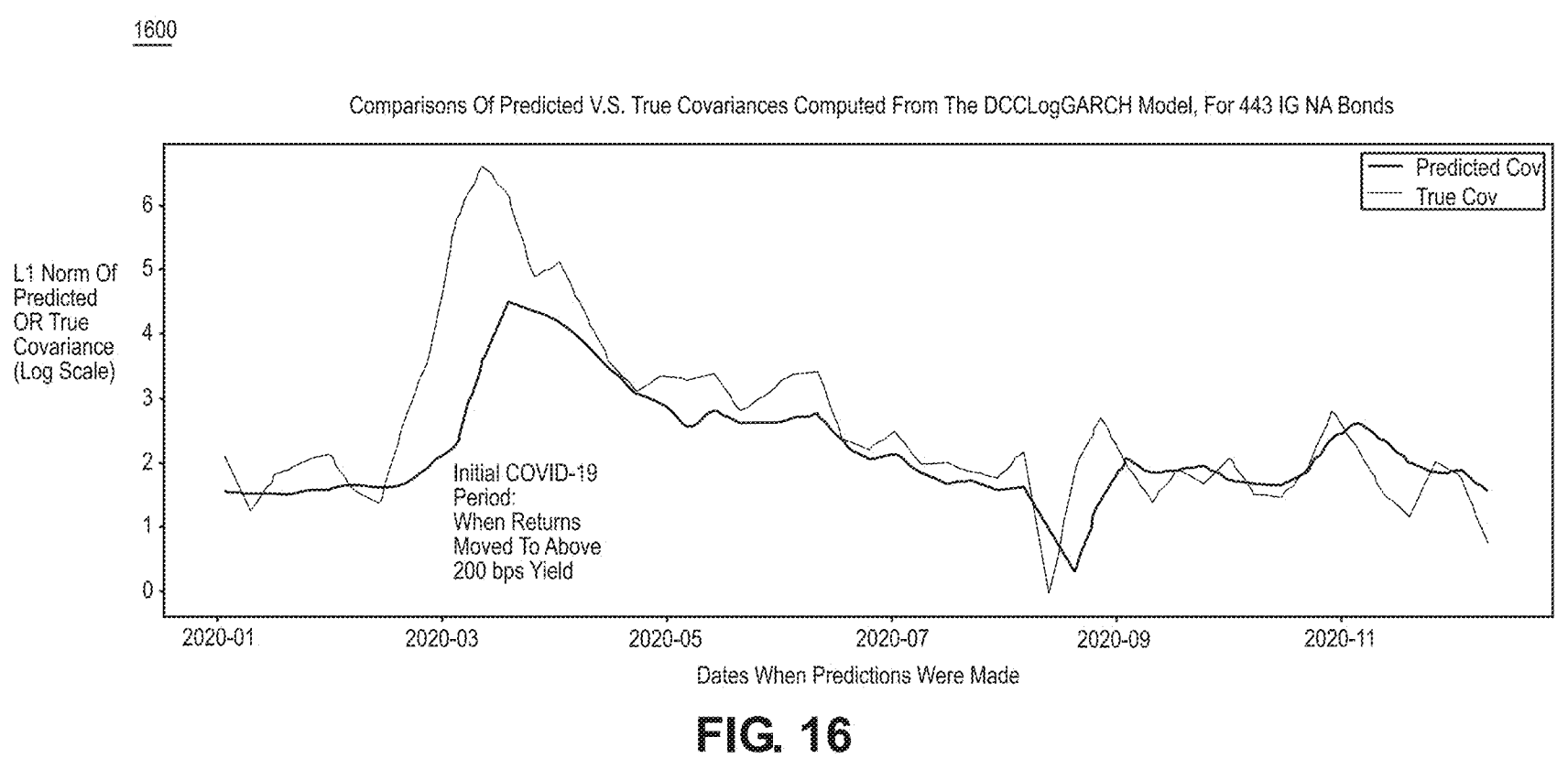

Comparisons Of Predicted V.S. True Covariances Computed From The DCCLogGARCH Model, For 443 IG NA Bonds Predicted Cov
True Cov Initial COVID-19 Period:
When Returns Moved To Above 200 bps Yield L1 Norm Of Predicted OR True Covariance (Log Scale)

6
5
4
3
2
1
0

2020-01   2020-03   2020-05   2020-07   2020-09   2020-11

Dates When Predictions Were Made

FIG. 16

METHOD AND SYSTEM FOR COVARIANCE MATRIX ESTIMATION

BACKGROUND

1. Field of the Disclosure

This technology generally relates to methods and systems for estimating a covariance matrix, and more particularly, to methods and systems for providing a model for fast-changing, time-dynamic, asset-agnostic covariance matrix estimation to be used for hedging large baskets of securities.

2. Background Information

Traders in financial markets often use hedging techniques to provide a risk counterbalance with respect to investing positions. In order to determine effective hedging strategies, it would be useful to avail a model that outputs a fast-changing time-dynamic covariance matrix of the bond returns for a given set of bond returns and external seasonal data, and that could be used to hedge large baskets of securities, in particular when the number of bonds to potentially hedge against are in the thousands.

To understand this problem, a simple equation where the number of contracts of an instrument to be hedged with is a function of a hedge ratio, h, is useful:

$$h = \rho_t \frac{\sigma_{\Delta s}}{\sigma_{\Delta f}}$$

This hedge ratio term depends on the volatility of the instrument to be hedged against, $\sigma_{\Delta s}$, and of the instrument to be used to hedge with, $\sigma_{\Delta f}$. There is also a term that measures the correlation between the change in price of these instruments pr. To measure these volatility $\sigma$ and correlation p terms, such as measurement could be made by using standard statistics. For example, to measure the volatility, the standard deviation of the instruments could be taken, and to measure the correlation, the covariance of the bond returns could be calculated (i.e., dividing by the volatility results in the correlation), using their second moments or using principle component analysis (PCA). However, there are some difficulties with this traditional approach.

First, the volatility of the bond returns changes rapidly. This means that the data is not identically distributed, and thus using simple statistics like the second moment to represent the volatility would be meaningless. This also means that the covariance matrix between bonds is rapidly changing, so traditional methods like PCA would be too slow to capture the most recent covariance behaviors.

Second, it is desirable to build a covariance matrix from thousands of bonds, requiring millions of parameters to fit for using traditional statistics. For a basket of 2000 bonds, this would require eight (8) years of historic data. This amount of historic data would result in a very slow-changing covariance matrix. Further, most datasets have at most two years of historic data. In addition to the lack of historic data, the dataset may also be stale, thus traditional regression models, autoregressive or moving average models, where a predicted bond return is a function of the observed bond returns from previous day(s), would need to be modified to compute the exogenous variables. For such types of models, the regression errors may also be influenced by external factors (e.g., leverage terms, seasonality like nonfarm payrolls, bond liquidity, time to maturity, sector, or credit rating), which then affects the volatility of the bond returns.

Third, from heuristics, it is desirable to keep the covariance matrix generally positive definite. For example, the diagonal must be positive, as the variance of a bond cannot be negative. Further, a zero variance indicates a completely stale dataset. This constraint can be tricky to achieve, in particular, as it is also necessary to ensure that the likelihood function of the model is continuous and differentiable. Thus, merely taking the absolute value of a parameter to build a positive definite matrix would not provide good derivatives.

Finally, scaling a model to compute time-dynamic covariance matrices with thousands of bonds can be very slow and take several days. Thus, it is desirable to use a model to train on thousands of bonds in a relatively short time interval.

Accordingly, there is a need for a machine learning model that outputs a fast-changing time-dynamic covariance matrix of the bond returns for a given set of bond returns and external seasonal data in an efficient and accurate manner.

SUMMARY

The present disclosure, through one or more of its various aspects, embodiments, and/or specific features or sub-components, provides, inter alia, various systems, servers, devices, methods, media, programs, and platforms for implementing a model for fast-changing, time-dynamic, asset-agnostic covariance matrix estimation to be used for hedging large baskets of securities.

According to an aspect of the present disclosure, a method for estimating a covariance with respect to a plurality of bonds is provided. The method is implemented by at least one processor. The method includes: receiving, by the at least one processor, first information that relates to historical bond market data; using a first algorithm based on an Auto-Regressive-Moving-Average (ARMA) model to calculate ARMA model regression errors based on the historical bond market data; using a second algorithm based on a logarithmic Generalized AutoRegressive Conditional Heteroskedasticity (GARCH) model to calculate an estimated volatility vector based on the ARMA model regression errors; using the calculated ARMA model regression errors and the calculated volatility vector to estimate a time-varying covariance matrix of the set of ARMA model regression errors with respect to the historical bond market data; using the estimated time-covariance matrix of the ARMA model regression errors and the calculated volatility vector to estimate a time-varying covariance matrix of the bond returns; and using the estimated time-varying covariance matrix of the bond returns to calculate a set of predicted hedge ratios.

Each of the ARMA model and the GARCH model may be based on vectorized parameters that are derived from the historical bond market data.

The method may further include: receiving, by the at least one processor, second information that relates to seasonal payroll data; and adjusting at least one from among the set of regression errors based on the second information.

The historical bond market data may include historical price data that relates to at least 10,000 different bonds and that is less than two years old.

The using of the first algorithm based on an Auto-Regressive-Moving-Average (ARMA) model to calculate a set of ARMA model regression errors based on the historical bond market data may include: using an ordinary least squares technique with respect to a first subset of the bond market data to estimate respective values of at least two parameters of the first algorithm; training the ARMA model based on a second subset of the bond market data that corresponds to the predetermined training interval; and adjusting the estimated respective values of the at least two parameters based on a result of the training.

The method may further include: receiving third information that relates to bond market data corresponding to a next predetermined time interval that occurs after the predetermined training interval; retraining the ARMA model based on the third information; and readjusting the estimated respective values of the at least two parameters based on a result of the retraining.

The method may further include displaying, on a user interface, a result of the calculating of the predicted hedge ratios that includes a respective graph of a fractional change in a corresponding return of each of a first instrument against which a hedge would be made and a plurality of candidate instruments to potentially be used for hedging as a function of a prediction date.

The method may further include displaying, on the user interface, a graph of ratios of standard deviations between the first instrument and each of the plurality of candidate instruments.

The method may further include displaying, on the user interface, a graph of the hedge ratio of at least one of the plurality of candidate instruments with respect to the first instrument as a function of the prediction date.

According to another aspect of the present disclosure, a computing apparatus for estimating a covariance with respect to a plurality of bonds is provided. The computing apparatus includes a processor, a display device, a memory, and a communication interface coupled to each of the processor, the display device, and the memory. The processor is configured to: receive, via the communication interface, first information that relates to historical bond market data; use a first algorithm based on an Auto-Regressive-Moving-Average (ARMA) model to calculate ARMA model regression errors based on the historical bond market data; use a second algorithm based on a logarithmic Generalized AutoRegressive Conditional Heteroskedasticity (GARCH) model to calculate an estimated volatility vector based on the ARMA model regression errors; use the ARMA model regression errors and the calculated volatility vector to estimate a time-varying covariance matrix of the set of ARMA model regression errors with respect to the historical bond market data; use the estimated time-covariance matrix of the ARMA model regression errors and the calculated volatility vector to estimate a time-varying covariance matrix of the bond returns; and use the estimated time-varying covariance matrix of the bond returns to calculate a set of predicted hedge ratios.

Each of the ARMA model and the GARCH model may be based on vectorized parameters that are derived from the historical bond market data.

The processor may be further configured to: receive, via the communication interface, second information that relates to seasonal payroll data; and adjust at least one from among the set of regression errors based on the second information.

The historical bond market data may include historical price data that relates to at least 5000 different bonds and that may be less than two years old.

The processor may be further configured to use the first algorithm based on an Auto-Regressive-Moving-Average (ARMA) model to calculate regression errors based on the historical bond market data by: using an ordinary least squares technique with respect to a first subset of the bond market data to estimate respective values of at least two parameters of the first algorithm; training the ARMA model based on a second subset of the bond market data that corresponds to the predetermined training interval; and adjusting the estimated respective values of the at least two parameters based on a result of the training.

The processor may be further configured to: receive, via the communication interface, third information that relates to bond market data corresponding to a next predetermined time interval that occurs after the predetermined training interval; retrain the ARMA model based on the third information; and readjust the estimated respective values of the at least two parameters based on a result of the retraining.

The processor may be further configured to display, on a user interface of the display device, a result of the calculating of the predicted hedge ratios that includes a respective graph of a fractional change in a corresponding return of each of a first instrument against which a hedge would be made and a plurality of candidate instruments to potentially be used for hedging as a function of a prediction date.

The processor may be further configured to display, on the user interface of the display device, a graph of ratios of standard deviations between the first instrument and each of the plurality of candidate instruments.

The processor may be further configured to display, on the user interface of the display device, a graph of the hedge ratio of at least one of the plurality of candidate instruments with respect to the first instrument as a function of the prediction date.

According to yet another aspect of the present disclosure, a non-transitory computer readable storage medium storing instructions for estimating a covariance with respect to a plurality of bonds is provided. The storage medium includes executable code which, when executed by at least one processor, causes the at least one processor to: receive first information that relates to historical bond market data; use a first algorithm based on an Auto-Regressive-Moving-Average (ARMA) model to calculate an estimated set of ARMA model regression errors based on the historical bond market data; use a second algorithm based on a logarithmic Generalized AutoRegressive Conditional Heteroskedasticity (GARCH) model to calculate an estimated volatility vector based on the historical bond market data; use the ARMA model regression errors and the calculated volatility vector to estimate a time-varying covariance matrix of the set of ARMA model regression errors with respect to the historical bond market data; use the estimated time-covariance matrix of the ARMA model regression errors and the calculated volatility vector to estimate a time-varying covariance matrix of the bond returns; and use the estimated time-varying covariance matrix of the bond returns to calculate a set of predicted hedge ratios.

Each of the ARMA model and the GARCH model may be based on vectorized parameters that are derived from the historical bond market data.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

FIG. 4 is a flowchart of an exemplary process for implementing a method for providing a model for fast-changing, time-dynamic, asset-agnostic covariance matrix estimation to be used for hedging large baskets of securities.

FIG. 16 is a set of graphs that illustrates a comparison between an L1 norm of a predicted covariance matrix and an L1 norm of a true covariance matrix for historical bond market data, according to an exemplary embodiment.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
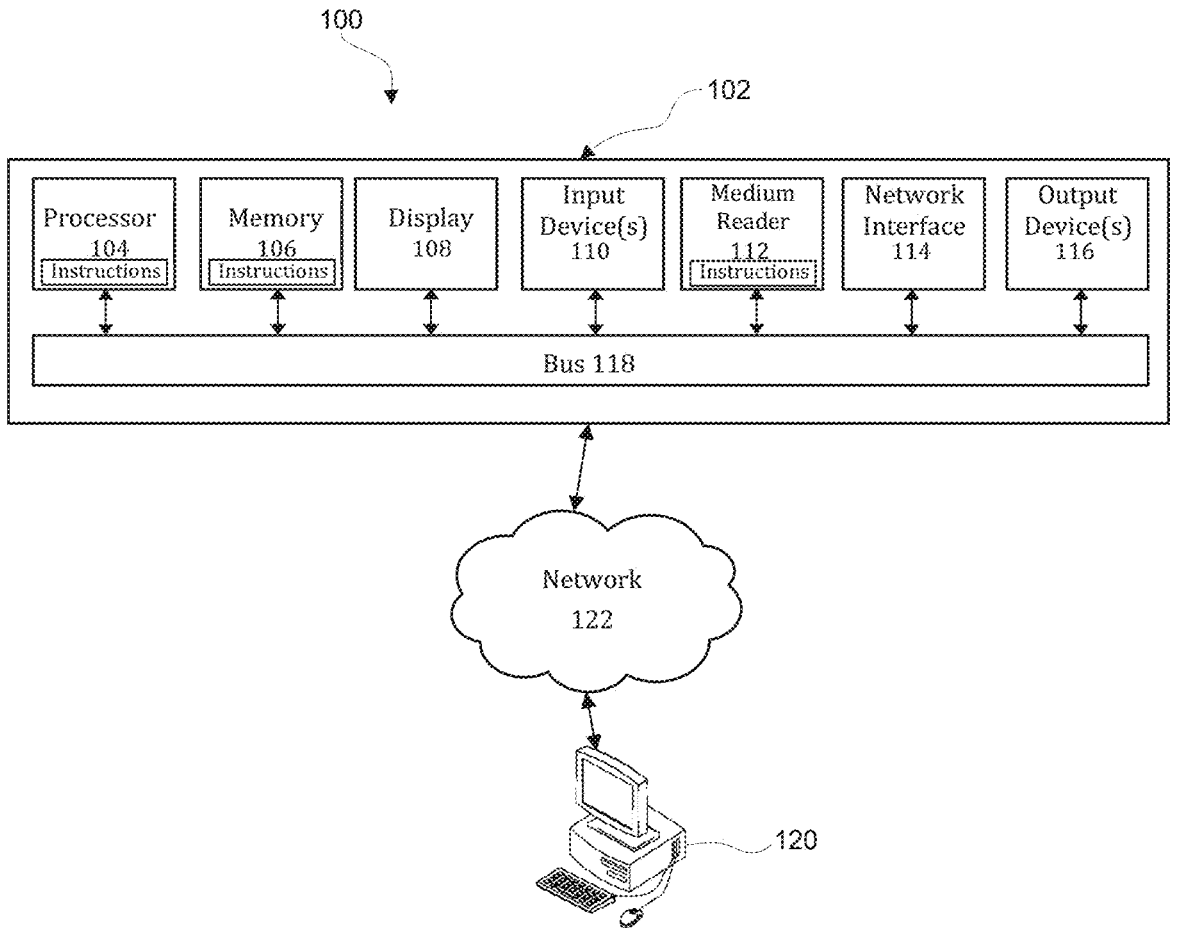
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field program-mable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communica-tion. Memories described herein are tangible storage medi-ums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alter-native, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hard-ware, software or any combination thereof which are com-monly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an inter-nal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network com-monly known and understood in the art. The short-range network may include, for example, Bluetooth, Zigbee, infra-red, near field communication, ultraband, or any combina-tion thereof. Those skilled in the art appreciate that addi-tional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a commu-nications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without depart-ing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclu-sive.

In accordance with various embodiments of the present disclosure, the methods described herein may be imple-mented using a hardware computer system that executes software programs. Further, in an exemplary, non-limited embodiment, implementations can include distributed processing, component/object distributed processing, and parallel processing. Virtual computer system processing can be constructed to implement one or more of the methods or functionality as described herein, and a processor described herein may be used to support a virtual processing environment.

As described herein, various embodiments provide optimized methods and systems for providing a model for fast-changing, time-dynamic, asset-agnostic covariance matrix estimation to be used for hedging large baskets of securities.

Figure 2:
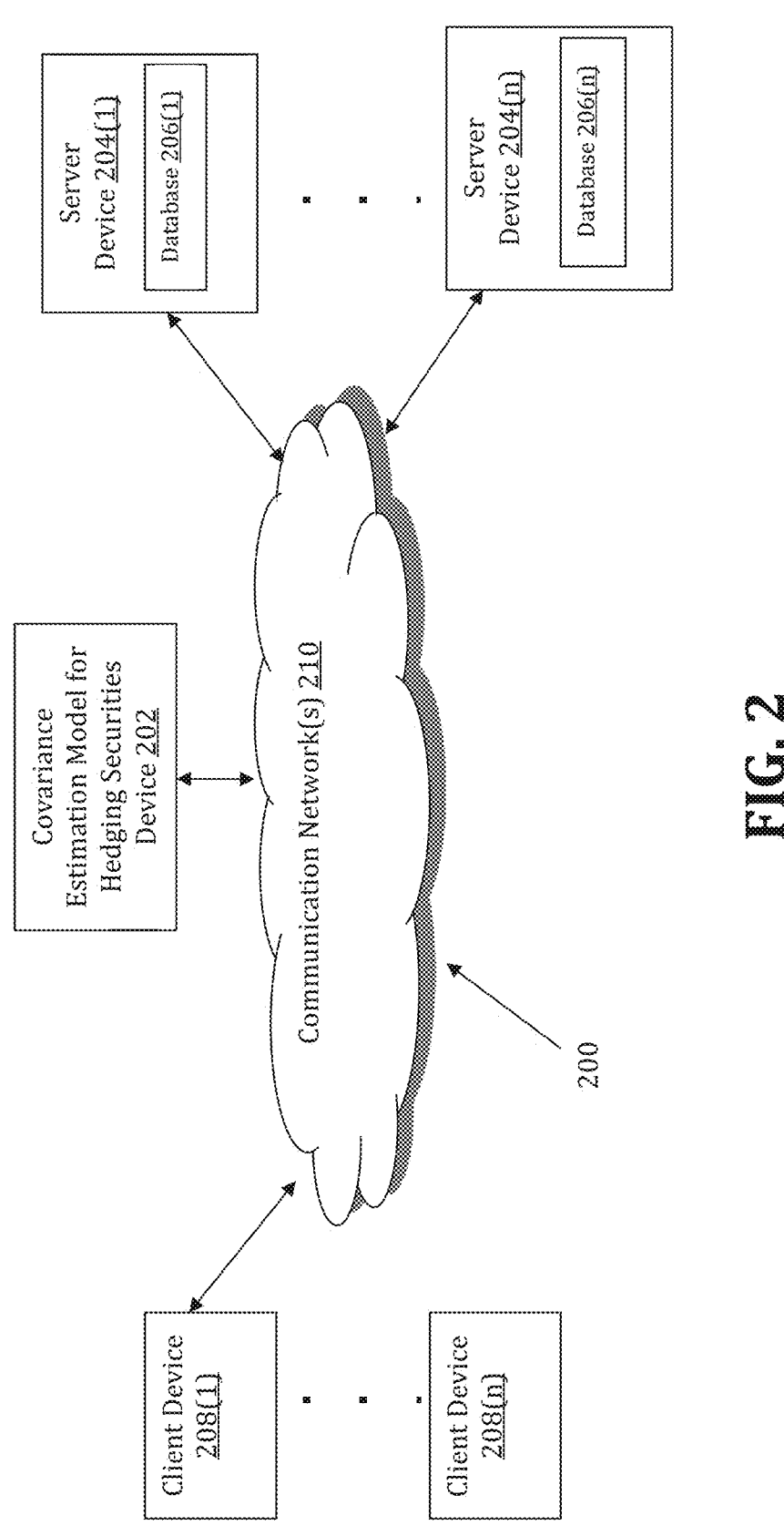
FIG. 2 illustrates an exemplary diagram of a network environment.

Referring to FIG. 2, a schematic of an exemplary network environment 200 for implementing a method for providing a model for fast-changing, time-dynamic, asset-agnostic covariance matrix estimation to be used for hedging large baskets of securities is illustrated. In an exemplary embodiment, the method is executable on any networked computer platform, such as, for example, a personal computer (PC).

The method for providing a model for fast-changing, time-dynamic, asset-agnostic covariance matrix estimation to be used for hedging large baskets of securities may be implemented by a Covariance Estimation Model for Hedging Securities (CEMHS) device 202. The CEMHS device 202 may be the same or similar to the computer system 102 as described with respect to FIG. 1. The CEMHS device 202 may store one or more applications that can include executable instructions that, when executed by the CEMHS device 202, cause the CEMHS device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the CEMHS device 202 itself, may be located in virtual server(s) running in a cloud-based computing environment rather than being tied to one or more specific physical network computing devices. Also, the application(s) may be running in one or more virtual machines (VMs) executing on the CEMHS device 202. Additionally, in one or more embodiments of this technology, virtual machine(s) running on the CEMHS device 202 may be managed or supervised by a hypervisor.

In the network environment 200 of FIG. 2, the CEMHS device 202 is coupled to a plurality of server devices 204(1)-204(n) that hosts a plurality of databases 206(1)-206(n), and also to a plurality of client devices 208(1)-208(n) via communication network(s) 210. A communication interface of the CEMHS device 202, such as the network interface 114 of the computer system 102 of FIG. 1, operatively couples and communicates between the CEMHS device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the CEMHS device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and CEMHS devices that efficiently implement a method for providing a model for fast-changing, time-dynamic, asset-agnostic covariance matrix estimation to be used for hedging large baskets of securities.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The CEMHS device 202 may be a standalone device or integrated with one or more other devices or apparatuses, such as one or more of the server devices 204(1)-204(n), for example. In one particular example, the CEMHS device 202 may include or be hosted by one of the server devices 204(1)-204(n), and other arrangements are also possible. Moreover, one or more of the devices of the CEMHS device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the CEMHS device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) host the databases 206(1)-206(n) that are configured to store historical bond market data and covariance matrix parameters data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the CEMHS device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the CEMHS device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the CEMHS device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the CEMHS device 202, the server devices 204(1)-204(n), or the client devices 208(1)-208(n), for example, may be configured to operate as virtual instances on the same physical machine. In other words, one or more of the CEMHS device 202, the server devices 204(1)-204(n), or the client devices 208(1)-208(n) may operate on the same physical device rather than as separate devices communicating through communication network(s) 210. Additionally, there may be more or fewer CEMHS devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
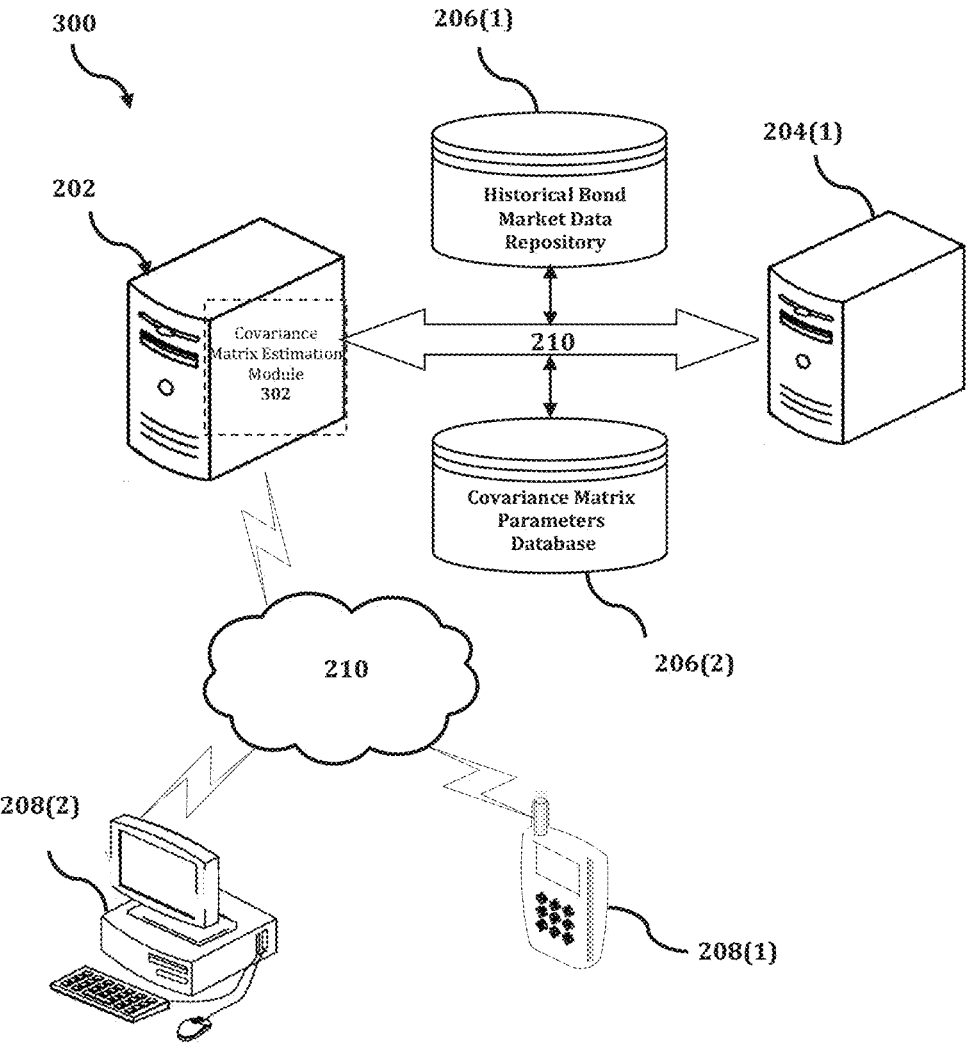
FIG. 3 shows an exemplary system for implementing a method for providing a model for fast-changing, time-dynamic, asset-agnostic covariance matrix estimation to be used for hedging large baskets of securities.

The CEMHS device 202 is described and shown in FIG. 3 as including a covariance matrix estimation module 302, although it may include other rules, policies, modules, databases, or applications, for example. As will be described below, the covariance matrix estimation module 302 is configured to implement a method for providing a model for fast-changing, time-dynamic, asset-agnostic covariance matrix estimation to be used for hedging large baskets of securities in an automated, efficient, scalable, and reliable manner.

An exemplary process 300 for implementing a method for providing a model for fast-changing, time-dynamic, asset-agnostic covariance matrix estimation to be used for hedging large baskets of securities by utilizing the network environment of FIG. 2 is shown as being executed in FIG. 3. Specifically, a first client device 208(1) and a second client device 208(2) are illustrated as being in communication with CEMHS device 202. In this regard, the first client device 208(1) and the second client device 208(2) may be "clients" of the CEMHS device 202 and are described herein as such. Nevertheless, it is to be known and understood that the first client device 208(1) and/or the second client device 208(2) need not necessarily be "clients" of the CEMHS device 202, or any entity described in association therewith herein. Any additional or alternative relationship may exist between either or both of the first client device 208(1) and the second client device 208(2) and the CEMHS device 202, or no relationship may exist.

Further, CEMHS device 202 is illustrated as being able to access a historical bond market data repository 206(1) and a covariance matrix parameters database 206(2). The covariance matrix estimation module 302 may be configured to access these databases for implementing a method for providing a model for fast-changing, time-dynamic, asset-agnostic covariance matrix estimation to be used for hedging large baskets of securities.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the CEMHS device 202 via broadband or cellular communication. Of course, these embodiments are merely exemplary and are not limiting or exhaustive.

Upon being started, the covariance matrix estimation module 302 executes a process for providing a model for fast-changing, time-dynamic, asset-agnostic covariance matrix estimation to be used for hedging large baskets of securities. An exemplary process for providing a model for fast-changing, time-dynamic, asset-agnostic covariance matrix estimation to be used for hedging large baskets of securities is generally indicated at flowchart 400 in FIG. 4.

In the process 400 of FIG. 4, at step S402, the covariance matrix estimation module 302 receives first information that relates to historical bond market data. In an exemplary embodiment, the historical bond market data includes price data for a relatively large number of bonds, such as, for example, at least 1000 bonds, at least 5000 bonds, or at least 10,000 bonds, and the price data may be less than two years old.

At step S404, the covariance matrix estimation module 302 uses a first algorithm that is based on an Auto-Regressive-Moving-Average (ARMA) model to calculate a set of regression errors based on the first information received in step S402. In an exemplary embodiment, the ARMA model is based on vectorized parameters that are derived from the historical bond market data.

In an exemplary embodiment, the calculation of the regression errors may include the following operations: 1) using an ordinary least squares technique with respect to a first subset of the bond market data to estimate respective values of at least two parameters of the first algorithm; 2) training the ARMA model based on a second subset of the bond market data that corresponds to the predetermined training interval; and 3) adjusting the estimated respective values of the at least two parameters based on a result of the training. Further, the covariance matrix estimation module 302 may also receive additional bond market data that corresponds to a subsequent time interval that occurs after a predetermined training interval. When this occurs, the covariance matrix estimation module 302 may update the ARMA model by retraining the ARMA model based on the additional bond market data and then readjusting the estimated respective values of the at least two parameters based on a result of the retraining.

At step S406, the covariance matrix estimation module 302 uses a second algorithm that is based on a logarithmic Generalized AutoRegressive Conditional Heteroskedasticity (GARCH) model to calculate an estimated volatility vector based on the first information received in step S402. In an exemplary embodiment, the GARCH model is also based on vectorized parameters that are derived from the historical bond market data.

At step S408, the covariance matrix estimation module 302 uses the calculated regression errors and the calculated volatility vector to estimate a time-varying covariance matrix of the set of regression errors with respect to the historical bond market data. In an exemplary embodiment, one or more of the regression errors may be adjusted based on additional information, such as, for example, seasonal payroll data that is received by the covariance matrix estimation module 302. Then, at step S410, the covariance matrix estimation module 302 estimates a time-varying covariance matrix of the bond returns.

At step S412, the covariance matrix estimation module 302 uses the estimated time-varying covariance matrix of the bond returns to predict a set of hedging ratios. Then, at step S414, the covariance matrix estimation module 302 displays results from the prediction on a user interface of a display device. For example, the covariance matrix estimation module 302 may display, on the user interface, a graph of a fractional change in a corresponding return of each of a first instrument (e.g., a bond) against which a hedge would potentially be made and a plurality of candidate instruments (e.g., candidate bonds) to potentially be used for hedging as a function of a prediction date. As another example, the covariance matrix estimation module 302 may display, on the user interface, a graph of ratios of standard deviations between the first instrument and each of the plurality of candidate instruments. As yet another example, the covariance matrix estimation module 302 may display, on the user interface, a graph of the hedge ratio of at least one candidate instrument with respect to the first instrument as a function of the prediction date.

In an exemplary embodiment, a model is disclosed that can 1) generate (fast-changing and positive definite covariance matrices, and volatility terms, which can 2) scale to work for thousands of bonds, 3) with only two (2) years of historic data, and 4) which can be trained in only a few hours. In turn, this model achieves a more optimal computation of hedging ratios used to determine the optimal combination of bonds to hedge against given portfolios.

In an exemplary embodiment, a way to output a covariance matrix without needing a long period of historic data to produce a covariance matrix of many bonds is provided. This design generates a fast-changing, "instantaneous" matrix using only the most recent one to two months of historic data ($C_{t-i}^d$), which is then projected onto a second fast-changing matrix. This second matrix is not "instantaneous," as it uses the past one to two years of data ($R_t$), but it is still fast-changing. This is described further below.

In an exemplary embodiment, this methodology is based an Auto-Regressive Moving-Average (ARMA) regression model, where the errors follow a Generalized Autoregressive Conditional Heteroskedasticity (GARCH) model. The volatility terms (i.e., $\sigma$'s) can be extracted from the GARCH model and used to compute the hedge ratios. Furthermore, these volatility terms ($\sigma$'s) are combined with the second fast-changing but "not-instantaneous" matrix ($R_t$) to output the covariance matrix for the hedge ratios. This is described further below.

In an exemplary embodiment, the model is capable of handling stale data. These methods involve retrieving only data ending on a particular weekday (e.g., data falling only on Mondays), then training the model with the retrieved data for one iteration. During this training, some computations are frozen for values that do not fall on this weekday, and only values that do fall on this weekday are updated. Next, the data to be retrieved is shifted so that it falls on the next weekday (e.g., data falling only on Tuesdays), and do the same thing again. The application of technique enables an achievement of covariance matrices/volatility terms without bias, as described further below.

In an exemplary embodiment, virtually every component of the model is designed to be in a vectorized form. This vectorization enables a reduction in computation times from days to hours or even minutes. This acceleration of computation is described further below.

In an exemplary embodiment, the methodology also provides a way to achieve a proxy for what a "true" covariance matrix would be. This proxy is consistent, and thus enables a determination of how accurate the resultant covariance matrices are, compared with those generated by other methods. This is described further below.

In an exemplary embodiment, the methodology also provides several ways to enable the model to consistently converge towards the ground truth values. The first design sub-component involves adding a perturbation to the parameters in the second fast-changing "not-instantaneous" matrix $R_t$ to avoid these parameters converging to extreme values. This is described further below.

The second design sub-component involves using a specific sequence, by first training the model by assuming the second fast-changing "non-instantaneous" matrix $R_t$ is static (conventionally, this training technique may be referred to as training on a Constant Conditional Correlation (CCC) model), and then and after a number of epochs, switching $R_t$ back to its time-dynamic form (i.e., training on a Dynamic Conditional Correlation (DCC) model). This is also described further below.

The third design sub-component involves initializing the ARMA parameters using Ordinary Least Squares (OLS). This is also described further below.

The fourth design sub-component is used for updating an already-trained model with new data. This involves regularizing the change in parameters when new data is first introduced in the first iteration. This is also further described below.

In an exemplary embodiment, the methodology also includes a way to forecast what the covariance matrix will be at some future time (e.g., in 3 months, in 6 months, in 12 months, etc.). This capability yields much higher accuracy, especially during volatile periods such as, for example, during the COVID-19 pandemic.

In an exemplary embodiment, the methodology is implemented into a single architecture, which works in synchronization to achieve an optimal set of covariance matrix/volatility terms.

In an exemplary embodiment, the model may be understood as including two parts—i.e., a base model and enhancements to the base model. The base model includes several components that describe the different behaviors of a fast-changing covariance matrix. First, bond returns that are normalized by the clean price on the previous day are used, based on the following Equation 1:

$$y_{k,t} = \frac{p_{k,t} - p_{k,t-1}}{p_{k,t-1}}, \qquad \text{Equation 1}$$

where $y_{k,t}$ and $p_{k,t}$ are the return and price for bond k at time t, respectively. In the following, $y_t = (y_{1,t}, \ldots y_{K,t})^T$ is to denote the returns from bond 1 to bond K at time t in a vector.

It is assumed that this return can be described by a ARMA model (Equation 2):

$$y_{k,t} = a_{k,0} + a_{k,1} y_{k,t-1} + b_{k,1} \epsilon_{k,t-1} + \epsilon_{k,t}, \qquad \text{Equation 2:}$$

where $a_{k,0}$, $a_{k,1}$ and $b_{k,1}$ are constant parameters. In a vector form, $y_t = a_0 + a_1 y_{t-1} + b_1 \epsilon_{t-1} + \epsilon_t$, where $a_0 = (a_{0,0}, \ldots, a_{K,0})^T$, $a_1 = (a_{0,1}, \ldots, a_{K,1})^T$ and $b_1 = (b_{0,1}, \ldots, b_{K,1})^T$.

Moreover, $\epsilon_t$ can be decomposed as:

$$\epsilon_t = D_t z_t,$$

where $D_t = \text{diag}\{\sigma_{1,t}, \ldots, \sigma_{K,t}\}$ is a volatility vector, where $\sigma_{k,t}$ is the volatility for $\epsilon_{k,t}$, and where $z_t \sim \text{Normal}(0, R_t)$ is a random variable drawn from a zero-mean multivariate normal distribution, where $R_t$ is the covariance matrix for a multivariate normal distribution.

The terms $\sigma_{k,t}$ and $R_t$ are modeled using a log-GARCH model and a time dynamic conditional correlation (DCC) model, respectively. The log-GARCH model can be represented as Equation 3:

$$\ln \sigma_{k,t}^2 = \alpha_{k,0} + \alpha_{k,1} \ln \epsilon_{k,t-1}^2 + \beta_{k,1} \ln \sigma_{k,t-1}^1, \qquad \text{Equation 3:}$$

where $\alpha c_{k,1} + \beta_{k,1} < 1$ to ensure stability, and where the log-part ensures that the volatility is always positive.

The DCC model $R_t$ is in form of an ARMA model, as in Equation 4:

$$R_t = (1 - a_{Rt} - b_{Rt}) R + a_{Rt} R_{T-1} + b_{Rt} \Psi_{t-1} \qquad \text{Equation 4:}$$

where $\Psi_{t-1}$ is the instantaneous correlation matrix to capture short-term correlation dynamics and is computed by an empirical correlation matrix $\hat{\Psi}_t$:

$$\Psi_t = \hat{\Psi}_t = \frac{\sum_{i=t-M+1}^{t} \epsilon_i \epsilon_i^T}{\left(\sqrt{\sum_{i=t-M+1}^{t} \epsilon_i^2}\right)\left(\sqrt{\sum_{i=t-M+1}^{t} \epsilon_i^2}\right)^T}$$

where, to ensure $\Psi_t$ is positive definite (as it is a correlation matrix, and this would also ensure Rt is positive definite), M must be equal to or greater than the number of assets. For 2000 bonds, this means eight (8) years of historic $\epsilon$s would be needed. In an exemplary embodiment, this amount of data is impractical, and further, 8 years of data is not very "instantaneous". Thus, due to the high-dimension property in this case, $\hat{\Psi}_t$ performs poorly in the estimation of $\Psi_t$.

To overcome this problem, a new matrix, $C_t^d$, is provided, which has the value of 1 along the diagonal, and a unique value for all off-diagonal elements. $C_t^d$ is then used to model $\Psi_t$ as closely as possible. That is, as expressed in Equation 5, $$\Psi_t = C_t^d = \begin{bmatrix} 1 & c_t^d & \ldots & c_t^d \\ c_t^d & 1 & \ldots & c_t^d \\ \ldots & \ldots & \ldots & \ldots \\ c_t^d & c_t^d & \ldots & 1 \end{bmatrix}, c_t^d = \text{argmin}_{c_t^d} |C_t^d - \hat{\Psi}_t|_{CMD}. \qquad \text{Equation 5}$$

where $|\bullet|_{CMD}$ is the correlation matrix distance.

With this method, the time-varying covariance matrix of the regression errors $\epsilon_t$ may be expressed as follows:

$$\text{cov}(\epsilon_t, \epsilon_t) = H_t = D_t R_t D_t,$$

which can then be used to predict what the DCC matrix $R_t$ and the volatility terms $\sigma_{k,t}$ will be at a future time k. Then, $R_t$ and the $\sigma_{k,t}$ terms can be used to predict the covariance of the bond returns, $\text{cov}(y_t, y_t)$, which in turn can be used to compute the hedge ratios. This model is optimized using maximum likelihood estimation (MLE) and a custom Tensorflow model, as described below.

Scaling to thousands of bonds: MLE is used to estimate the parameters in the proposed model, $*a_0, a_1, b_1, \alpha_0, \alpha_1, \beta_1, a_R, b_R)$, where $\alpha_0 = (\alpha_{1,0}, \ldots, \alpha_{K,0})^T$, $\alpha_1 = (\alpha_{1,1}, \ldots, \alpha_{K,1})^T$ and $\beta_1 = (\beta_{1,1}, \ldots, \beta_{K,1})^T$.

Training this model takes a significant amount of time, in particular because the training is performed on thousands of bonds. The following steps are used to improve the efficiency of this model: First, $\Psi_{t-1}$ is block-diagonalized according to different sectors and bond maturities. Second, Ray tune's population-based tuning method is implemented to optimize hyperparameters without needing to do grid search. Next, the ARMA and GARCH models are vectorized to enable efficient computation as follows, which reduces the computation time from days to hours.

To vectorize the ARMA and GARCH terms, the following operations are performed: First, compute $\{\epsilon_i\}_{i=0}^{t}$ from observations $\{y_i\}_{i=0}^{t}$. Defining a lag operator L such that $L(x_t) = x_{t-1}$ for any time series variable Equation 2 can be rewritten as $(1 - a_{k,1} L) y_{k,t} = a_{k,0} + (1 + b_{k,1} L) \epsilon_{k,t}$. Therefore, $$\epsilon_{k,t} = -\frac{1}{1 + b_{k,1} L} a_{k,0} + \frac{1 - a_{k,1} L}{1 + a_{k,1}^2 L} y_{k,t} =$$

$$-\left(1 - b_{k,1} L + b_{k,1}^2 L^2 - b_{k,1}^3 L^3 + \ldots \right) a_{k,0} + (1 - a_{k,1} L)$$

$$\left(1 - b_{k,1} L + b_{k,1}^2 L^2 - b_{k,1}^3 L^3 + \ldots \right) y_{k,t} = -\left(1 - b_{k,t} + b_{k,1}^2 - b_{k,1}^3 + \ldots \right) a_{k,0} +$$

$$\left(1 - (a_{k,1} + b_{k,1}) L + (a_{k,1} + b_{k,1}) b_{k,1} L^2 - (a_{k,1} + b_{k,1}) b_{k,1} L^3 + \ldots \right) y_{k,t} =$$

$$-\frac{a_{k,0}}{1 + b_{k,1}} + y_{k,t} - (a_{k,1} + b_{k,1}) \sum_{i=1}^{t} (-b_{k,1})^{i-1} y_{k,t-i}$$

Using this formula, $\{\epsilon_i\}_{i=0}^{t}$ can be computed from $\{y_i\}_{i=0}^{t}$. Similarly, Equation 3 can be rewritten as $(1 - \beta_{k,1} L) \ln \sigma_{k,t}^2 = \alpha_{k,0} + \alpha_{k,1} L \ln \epsilon_{k,t}^2$. As a result, $\{\ln \sigma_{k,i}^2\}_{i=0}^{t}$ can be computed as $$\ln\sigma_{k,i}^2 = \frac{\alpha_{k,0}}{1-\beta_{k,1}} + \alpha_{k,1}\sum_{i=1}^{t}\beta_{k,1}^{i-1}\ln\epsilon_{k,t-i}^2,$$

and $\sigma_{k,i}$ can be easily computed via $\sqrt{\exp(\ln\sigma_{k,i}^2)}$.

Vectorizing $R_t$: In addition to vectorizing the ARMA and GARCH equations, the DCC matrix $R_t$ can also be vectorized. To do this, first compute $\{R_i\}_{i=0}^{t}$. Using the lag operator, Equation 4 can be rewritten as $$R_t = \frac{1-a_{Rt}-b_{Rt}}{1-a_{Rt}}R + b_{Rt}\sum_{i=1}^{t}a_{Rt}^{i-1}C_{t-i}^d.$$

Moreover, given the special structure of the CCC matrix in this model setting, this term can be expressed as $$R = \text{vec}_{r^o}(\text{vec}_{r^o})^T - \text{diag}(\text{vec}_{r^o}^2) + I.$$

where $\text{vec}_{r^o}$ is a K-dimensional vector, $\text{diag}(x)$ is a K×K matrix with x along the diagonal, and I is the identity matrix. Similarly, as the instantaneous correlation matrix $C_t^d$ has a unique value for all off-diagonal elements with ones along its diagonal (see Equation 5), $C_t^d$ can be rewritten as $$C_t^d = \text{vec}_{d^t}(\text{vec}_{d^t})^T - \text{diag}(\text{vec}_{d^t}^2) + I,$$

where $\text{vec}_{d^t} = (\sqrt{c_t^d}, \ldots, \sqrt{c_t^d})^T$. Using the vectors $\text{vec}_{r^o}$ and $\text{vec}_{d^t}$ to replace R and $C_t^d$, the correlation matrix $R_t$ becomes $$R_t = \frac{1-a_{Rt}-b_{Rt}}{1-a_{Rt}}\{\text{vec}_{r^o}(\text{vec}_{r^o})^T - \text{diag}(\text{vec}_{r^o}^2) + I\} +$$

$$b_{Rt}\sum_{i=1}^{t}a_{Rt}^i\{\text{vec}_{d^t}(\text{vec}_{d^t})^T - \text{diag}(\text{vec}_{d^t}^2) + I\} = \text{vec}_1(\text{vec}_1)^T + \text{vec}_2(\text{vec}_2)^T + A,$$

where $$\text{vec}_1 = \sqrt{\frac{1-a_{Rt}-b_{Rt}}{1-a_{Rt}}}\,\text{vec}_{r^o},$$

$$A = \frac{1-a_{Rt}-b_{Rt}}{1-a_{Rt}}\{I - \text{diag}(\text{vec}_{r^o}^2)\} + b_{Rt}\sum_{i=1}^{t}a_{Rt}^{i-1}(1-c_{t-i}^d)I$$

$$A = \frac{1-a_{Rt}-b_{Rt}}{1-a_{Rt}}\{I - \text{diag}(\text{vec}_{r^o}^2)\} + b_{Rt}\sum_{i=1}^{t}a_{Rt}^{i-1}(1-c_{t-i}^d)I$$

It is noted that A is a diagonal matrix and R is expressed as a sum of A, where A is the outer product of $\text{vec}_1$, and the outer product of $\text{vec}_2$, resulting from the proposed model setting. Benefiting from this, the computation for likelihood is more efficient and stable.

Vectorizing likelihood function: Finally, now that there are expressions for $\{\epsilon_t\}_{t=0}^{T}$, $\{\sigma_t\}_{t=0}^{T}$ and $\{R_t\}_{t=0}^{T}$, the likelihood computation can also be vectorized.

The likelihood can be computed by $\epsilon_t \sim N(0, D_t R_t D_t)$, where $D_t = \text{diag}(\sigma_t)$, $\epsilon_t = (\epsilon_{1,i}, \ldots, \sigma_{K,i})^T$, and $\sigma_t = (\sigma_{1,i}, \ldots, \sigma_{K,i})^T$. Therefore, using the likelihood formula of multivariate normal distribution, the log-likelihood of the proposed model can be expressed as $$\log|H_t| - \epsilon_t^T H_t^{-1}\epsilon_t, H_t = D_t R_t D_t.$$

up to a constant.

Given the vectorized version of Equation 4 above, the Sherman-Morrison Woodbury Theorem can be used to accelerate the computation.

Sherman-Morrison Woodbury Theorem: Given a square invertible n×n matrix A, an n×k matrix U, and a k×n matrix V, let B be an n×n matrix such that B=A+UV. Then, assuming $(I_k + VA^{-1}U)$ is invertible, this yields $$B^{-1} = A^{-1} - A^{-1}U(I_k + VA^{-1}U)^{-1}VA^{-1}.$$

where in this case, $H_t^{-1} = D_t^{-1}R_t^{-1}D_t^{-1}$. As $D_t$ is diagonal, its inverse is easy to compute. For the inverse of $R_t$, the using of Sherman-Morrison Woodbury Theorem changes the computational complexity form $O(K^3)$ to $O(K)$, by setting $U = (\text{vec}_1^T, \text{vec}_2^T)$ and $V = U^T$. As a result, $(I_k + VA^{-1}U)$ is a 2×2 matrix and its inverse is quite easy. Moreover, the computation of $\log|H_t|$ is convenient due to the model setting, $$|H_t| = |D_t R_t D_t| = |D_t|^2\left|\text{vec}_1(\text{vec}_1)^T + \text{vec}_2(\text{vec}_2)^T + A\right| =$$

$$|D_t|^2|A|\left|I + (\text{vec}_1, \text{vec}_2)^T A^{-1}(\text{vec}_1, \text{vec}_2)\right|$$

where $D_t$ and A are diagonal matrices and other terms are scalars.

Bespoke ways to reach convergence: Converging to the maximum likelihood estimation (MLE) of the parameters can be very challenging during training. In an exemplary embodiment, the following steps are proposed for enabling the parameters in the model to converge more smoothly to the MLE.

Perturbing $R_t$ parameters: Two of the most challenging parameters to converge are the terms $a_{Rt}$ and $b_{Rt}$ in the DCC matrix $R_t$. These terms often converge to extreme values. To constrain the parameters $a_{Rt}$ and $b_{Rt}$ away from extreme values, several methods have been attempted to fit for $a_{Rt}'$ and $b_{Rt}'$ and compute $a_{Rt}$ and $b_{Rt}$ from $a_{Rt}'$ and $b_{Rt}'$:

$$a_{Rt} = 0.5 + \sin(a_{Rt}' + 0.5)$$

$$b_{Rt} = (1-a_{Rt})(0.5 + \sin(b_{Rt}' + 0.5)) - \pi < (a_{Rt}, b_{Rt}) < \pi$$

$$a_{Rt} = \text{sigmoid}(a_{Rt}')$$

$$b_{Rt} = (1-a_{Rt})\,\text{sigmoid}(b_{Rt}')$$

The methods introduced by these equations have been found to be less helpful. Instead, in an exemplary embodiment, the model uses the following approach, using the hyperparameters "initialsd" and "decaysteps".

$$sd = \text{initialsd}\,\max(1 - \text{epochnum/decay steps}, 0.0)$$

where "epochnum" is the nth epoch of the training, and thus "sd" is some amount of noise perturbation that linearly decays over the course of the training. Then, this noise can be used to perturb the DCC matrix parameters $a_{Rt}$ and $b_{Rt}$. This can be seen by Equation 6:

$$a_{Rt} = \text{sigmoid}(a_{Rt}' * N(1, sd)) \qquad \text{Equation 6}$$

$$b_{Rt} = (1-a_{Rt})\,\text{sigmoid}(b_{Rt}' * N(1, sd))$$

Better results were also obtained by using this noise to perturb the pre-transformed CCC parameters $r_{t,k}'$, where k is the kth asset, as in Equation 7:

$$r_{t,k} = \text{sigmoid}(r_{t,k}' * N(1, sd)) \qquad \text{Equation 7:}$$

Initialization of parameters using ordinary least squares: Prior to training the model, ordinary least squares (OLS) is performed on the bond returns to estimate better values for the initial ARMA parameters. This was modified to reflect that data is typically observed one weekday at a time. The goal of the initialization method is to estimate the initial values of a, b, c in the original ARMA Equation 8:

$$y_t = a_0 + a_1 y_{t-1} + b_1 \epsilon_{t-1} + \epsilon_t \qquad \text{Equation 8:}$$

using Equation 9:

$$y_{t+5} = a' + b' y_t + c_0' \epsilon_t + c_1' \epsilon_{t+1} + c_2' \epsilon_{t+2} + c_3' \epsilon_{t+3} + c_4' \epsilon_{t+4} + \epsilon_{t+5} \qquad \text{Equation 9:}$$

where $a = f(a', b')$, $b = f(b')$, $c = f(b', (c_0', c_1', c_2', c_3', \text{ or } c_4'))$.

The first step of the initialization method is to estimate a and b. The behavior of the observed returns for a particular weekday (e.g., all daily data falling on "Monday"), follows the following ARMA model in Equation 10.

As per the definition of $\epsilon_t \sim \sigma_t z_t$, $z_t \sim \text{IID}(0, R_t)$, we know $E[\epsilon_t] = 0$. Thus, the $\epsilon_t$s can be treated as "noise":

$$y_{t+5} = a' + b' y_t + \eta_{t+5}, \eta_{t+5} = \Sigma_{i=0}^{5} c_i' \epsilon_{i+5} \qquad \text{Equation 10:}$$

where $\eta_{t+5}$ is a noise term, centered around zero. This is in the form $y_t = mx_t + b + \epsilon_t$, and thus, ordinary least squares (OLS) can be performed in order to estimate the true values of a' and b': $\hat{a}'$ and $\hat{b}'$.

Now that best initial values for a and b have been found, a best initial value for c is needed. Rearranging the terms in $\eta_{t+5} = \Sigma_{i=0}^{5} c_i' \epsilon_{i+5}$ in Equation 9, solve for $c_5' \epsilon_{i+5} = \epsilon_{i+5}$ since $C_5' = 1$.

$$\epsilon_{t+5} = \eta_{t+5} - c_0' \epsilon_t - c_1' \epsilon_{t+1} - c_2' \epsilon_{t+2} - c_3' \epsilon_{t+3} - c_4' \epsilon_{t+4}$$

However, it is also known that the next weekday, the "noise" term would be:

$$\eta_{t+10} = c_0' \epsilon_{t+5} + c_1' \epsilon_{t+6} + c_2' \epsilon_{t+7} + c_3' \epsilon_{t+8} + c_4' \epsilon_{t+9} + \epsilon_{t+10}$$

Substituting in $\epsilon_{t+5}$:

$$\eta_{t+10} = c_0'(\eta_{t+5} - c_0' \epsilon_t - c_1' \epsilon_{t+1} - c_2' \epsilon_{t+2} - c_3' \epsilon_{t+3} - c_4' \epsilon_{t+4}) + c_1' \epsilon_{t+6} + c_2' \epsilon_{t+7} + c_3' \epsilon_{t+8} + c_4' \epsilon_{t+9} + \epsilon_{t+10}$$

these noise terms can then be expressed as:

$$\eta_{t+10} = c_0' \eta_{t+5} + I_\eta, I_\eta = \Sigma_{i=0}^{5} c_i' \epsilon_{t+5+i} + \Sigma_{i=0}^{4}(-c_0') c_i' \epsilon_{t+i}$$

where $I_\eta$ is another noise term centered around zero. This is in the form $y_t = mx_t + \epsilon_t$, and thus OLS can be performed to estimate the true values of $c_0'$: $\hat{c}_0'$.

In summary, the true values of a', b', and $c_0'$ in the ARMA Equation 10 for observing daily data for one weekday. This allows for an estimation of the true values of $a = f(a', b')$, $b = f(b')$, $c = f(b', (c_0', c_1', c_2', c_3', \text{ or } c_4'))$ for the original ARMA Equation 8.

Finally, as the above steps are for one particular weekday (e.g., Monday), these steps can be repeated for the other four weekdays (e.g., Tuesday, Wednesday, Thursday and Friday). This means there are five (5) distinct sets of these estimated ARMA parameters â for a, b̂ for b, and ĉ for c, one computed from data for each day of the week. These can be combined to do a best-guess initialization for these parameters, e.g., $$\hat{a}_{final\ estimate} =$$

$$\frac{1}{5}(\hat{a}_{Monday\ data} + \hat{a}_{Tuesday\ data} + \hat{a}_{Wednesday\ data} + \hat{a}_{Thursday\ data} + \hat{a}_{Friday\ data}) + \zeta$$

where $\zeta$ is some noise.

Figure 5:
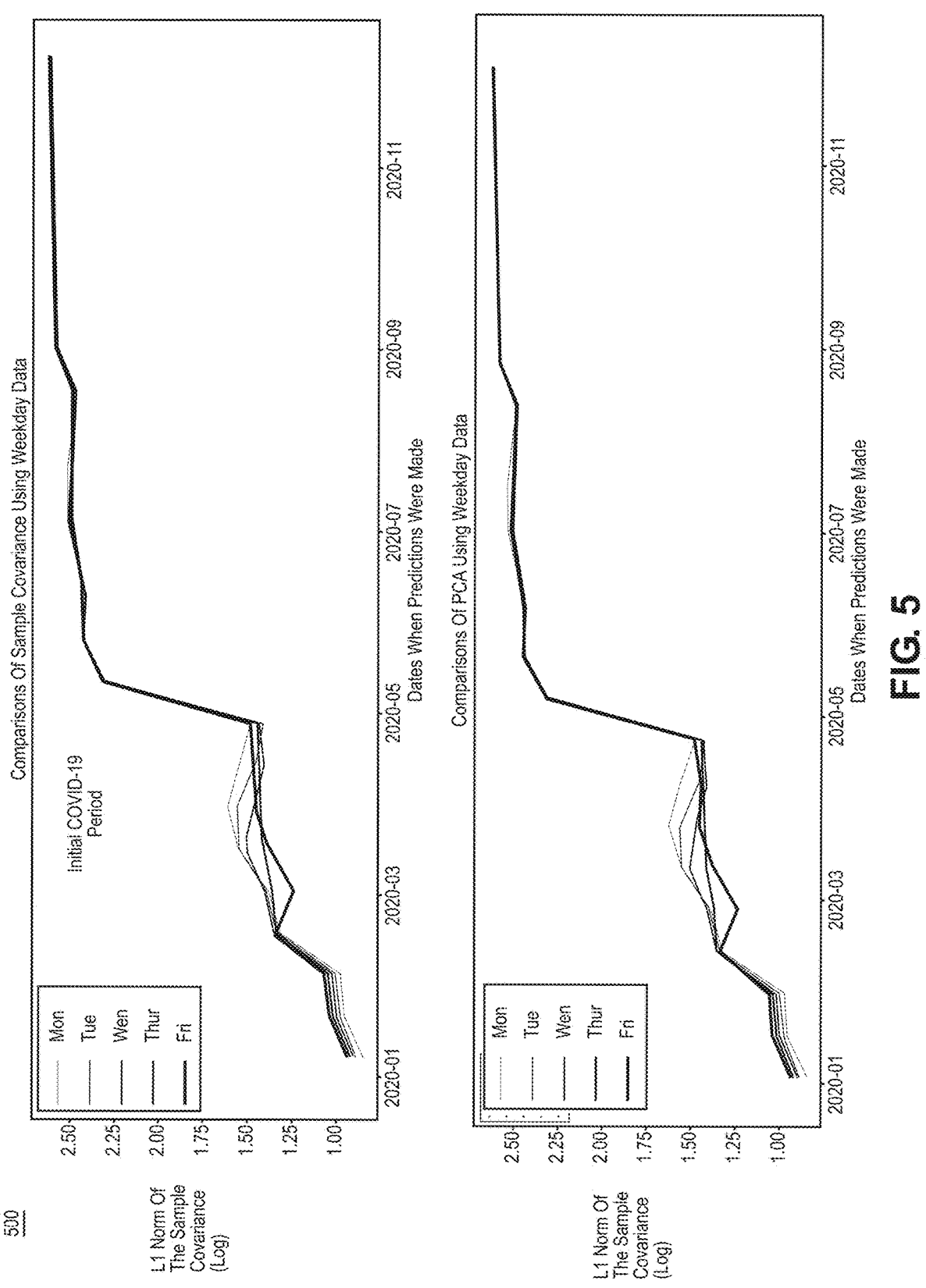
FIG. 5 is a set of graphs that illustrates a comparison between an L1 norm of a predicted covariance matrix and an estimation of a true covariance matrix for historical bond market data, according to an exemplary embodiment.

Stale data: In an exemplary embodiment, in addition to proposing methods to optimize the model for computation speed and better enabling the parameters to converge to their MLEs, a methodology for adapting the model to stale data is also proposed. At times, a data point might not be observed, and thus the model would not be able to compute the next day's bond return $y_{t+1}$. To tackle this problem, a common method may be to aggregate one week's worth of daily observations into a weekly bond return, such that missing data are absorbed into this averaging across the five weekdays. For example, a weekday period (e.g., Monday to Friday, or Tuesday to Monday of the next week) can be defined, and then an estimate of a weekly-granular representation of these bond returns can be done. However, this method may be biased, as it only shows one representation of the data. In reality there are four other representations of this data, each representation resulting in a different set of maximum likelihood estimates of model parameters. FIG. 5 shows why this can be a problem.

FIG. 5 is a set of graphs 500 that illustrates a comparison between an L1 norm of a predicted covariance matrix and an estimation of a true covariance matrix for historical bond market data, according to an exemplary embodiment. In short, using only one week-granularity representation of the data (e.g., aggregating Monday to Friday's data into one week) may result in different values of the covariance matrix. To avoid this problem, a way to train the model with all five weekly-granular representations of this data is provided. This means that for one epoch, the training is performed on data observed on a Monday; for the next epoch, the training is performed on a Tuesday, and so on. This is referred to as a "daily" model using "daily data", where the model is trained with daily-granular data. It is noted that this results in covariance matrices that can be predicted with daily-granularity. The daily covariance matrices are then aggregated into a weekly-granular representation that can be specified by the user. To do this, the ARMA computations are revised in the following way:

For each batch of daily data, the bond return is computed on day t+5 (represented by $y_{t+5}$) as a function of the return on the previous observed day t (represented by $y_t$), rather than on the previous non-observed weekday t+4 (represented by $y_{t+4}$). Following standard recursion, the ARMA model can be represented by Equation 11:

$$y_{t+5} = \qquad\qquad \text{Equation 11}$$
$$a' + b' y_t + c_0' \epsilon_t + c_1' \epsilon_{t+1} + c_2' \epsilon_{t+2} + c_3' \epsilon_{t+3} + c_4' \epsilon_{t+4} + c_5' \epsilon_{t+5}$$
$$a' = a + ba + b^2 a + b^3 a + b^4 a$$
$$b' = b^5$$
$$c_0' = b^4 c$$
$$c_1' = b^4 + b^3 c$$
$$c_1' = b^4 + b^3 c$$
$$c_2' = b^3 + b^2 c$$
$$c_3' = b^2 + bc$$
$$c_4' = b + c$$
$$c_5' = 1$$

However, in modifying this equation, there may also be many days worth of regression errors in between which it may not be possible to obtain, e.g., $\epsilon_{t+1}$, $\epsilon_{t+2}$, $\epsilon_{t+3}$, and $\epsilon_{t+4}$. As with the bond returns, it is possible only to obtain the regression errors $\epsilon_t$ and $\epsilon_{t+5}$. To address this, only the epsilons associated with the observed bond returns ($\epsilon_t$ and $\epsilon_{t+5}$ for $y_t$ and $y_{t+5}$ respectively) are updated, while keeping the rest fixed, and while maintaining the highly vectorized computations. This method is consistent and ultimately enables the $\epsilon_{t+}$ . . . parameters to converge after many iterations. As a result, the method proceeds to compute GARCH volatility terms, a DCC matrix, and a likelihood function.

The importance of training on all five representations of daily or weekly data, rather than just a single representation of a weekly-aggregation, can be seen in FIG. 5. In this aspect, both graphs 500 compare the L1-norm of the difference between the empirical estimation of the true covariance matrix and the predicted covariance matrices. The top graph shows predictions using the second moment, and the bottom graph shows predictions using principal component analysis (PCA) with the two largest eigenvalues.

Figure 6:
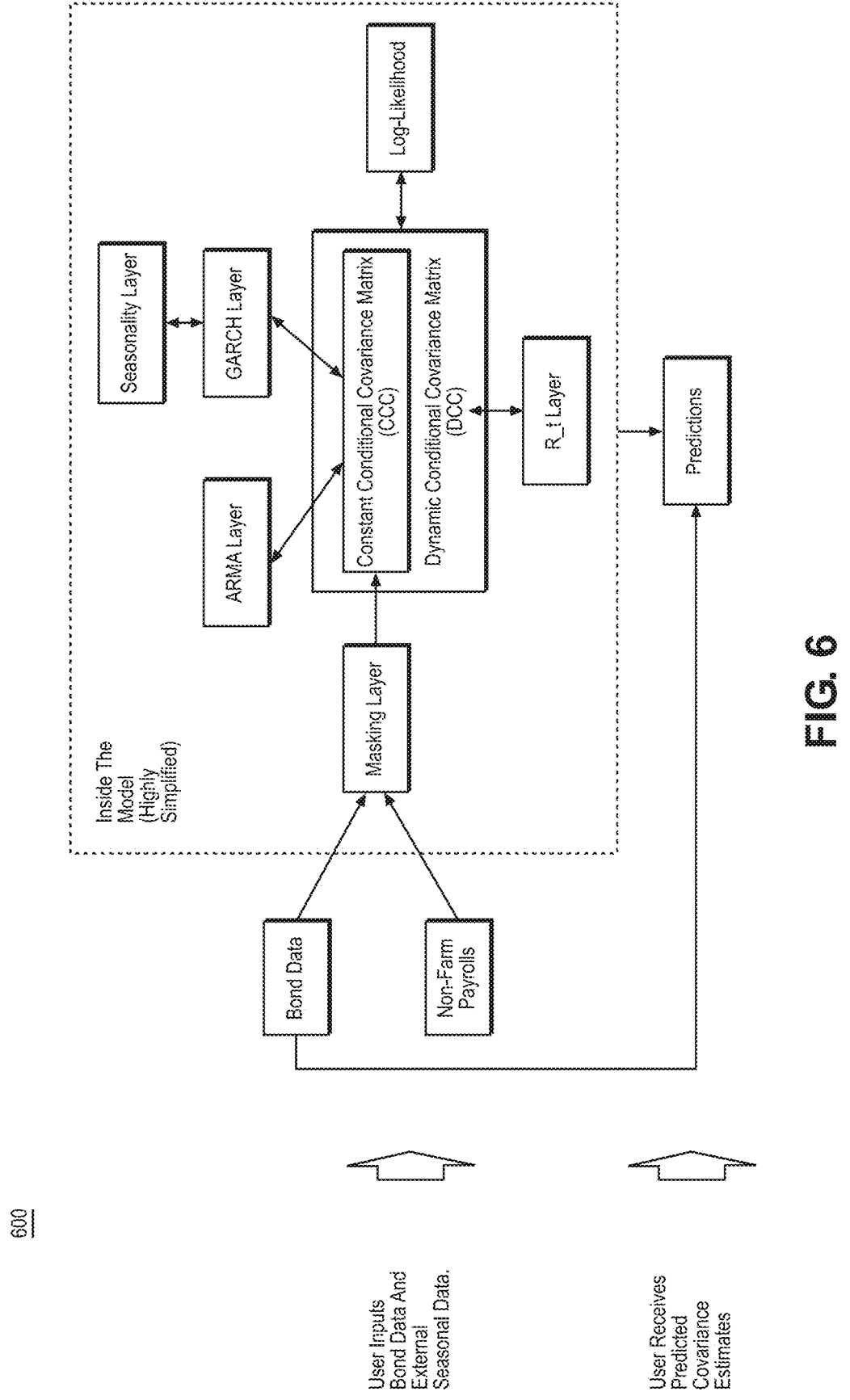
FIG. 6 is a block diagram of a system architecture for implementing a method for providing a model for fast-changing, time-dynamic, asset-agnostic covariance matrix estimation to be used for hedging large baskets of securities, according to an exemplary embodiment.

FIG. 5 is a set of curves that illustrate variations in the L1 norm of a predicted covariance matrix for historical bond market data, where each curve is trained on data aggregated over a different set of weekdays, according to an exemplary embodiment. FIG. 6 is a block diagram of a system architecture for implementing a method for providing a model for fast-changing, time-dynamic, asset-agnostic covariance matrix estimation to be used for hedging large baskets of securities, according to an exemplary embodiment.

Each graph in FIG. 5 shows five results, using the same data, but aggregated differently. For example, one curve had daily data aggregated to weekly-granularity, where a "week" is defined as the period from Monday to Friday. For another curve, a "week" is defined from Tuesday to next Monday, another from Wednesday to next Tuesday, and so on.

The covariance estimations using both traditional methods look very similar. However, one can see that the five sets are quite different, especially during the COVID period. This is because the weekly aggregation fails to capture short term dynamics. To overcome this incoherence, in an exemplary embodiment, the technique of using 5 sets of daily data, from Monday to Friday, iteratively, to train the model is used.

Training the model: In an exemplary embodiment, MLE is employed to train the model, for several reasons. First, many parameters are transformed by different functions, such as, for example, sigmoid. This then enables hypothesis testing in the same way without the transformation. Second, MLE facilitates a consistent convergence to the true value, with the smallest normally distributed error.

The use of MLE to train the model also facilitates an extraction of not only the parameters of the model, but also their confidence intervals, which are then used to test against the ground truth. In an exemplary embodiment, the confidence intervals are computed in Tensorflow, in part to allow for trainable variables of multi-dimensional shapes.

To enable a convergence of the model, the model is initially trained in a static matrix form, without a time dynamic component, and then after some number of epochs, the training of the model may switch to a time dynamic form. After convergence is achieved, confidence intervals may be computed, and a check against the ground truth may be performed. For three bonds, there are 23 parameters. For thousands of bonds, we have tens of thousands of parameters.

Architecture: FIG. 6 is a block diagram 600 of a system architecture for implementing a method for providing a model for fast-changing, time-dynamic, asset-agnostic covariance matrix estimation to be used for hedging large baskets of securities, according to an exemplary embodiment.

The bond returns and external data are sent into the model (from the left side in the block diagram 600). The data is then passed through a masking layer that slices the data into five sets of daily data. At the same time, ordinary least squares is used to initialize the parameters. Then, the data is passed into the ARMA and GARCH layers to fit for the mean-ARMA and log-GARCH parameters. Here, the estimation of $\epsilon_t$s may be updated. With these estimations, the instantaneous correlation matrix $\Psi_{t-1}$ in the "R layer" is computed. Finally, the likelihood function is computed. The core methodology in all these layers is described above.

From the user perspective, the model includes three parts: 1) user configuration; 2) training model; and 3) predictions. The user configuration enables the users to specify what they want to put into the model. This may include, for example, which bonds to observe, external data such as non-farm payrolls, the dates the predictions are to be made and how many days over which to predict, and the hyper-parameters to the model. Then, in step 2), a model class is instantiated, followed by a build, compilation, and operation of the model. Finally, in step 3), the model may be used to predict the covariances.

Figure 7:
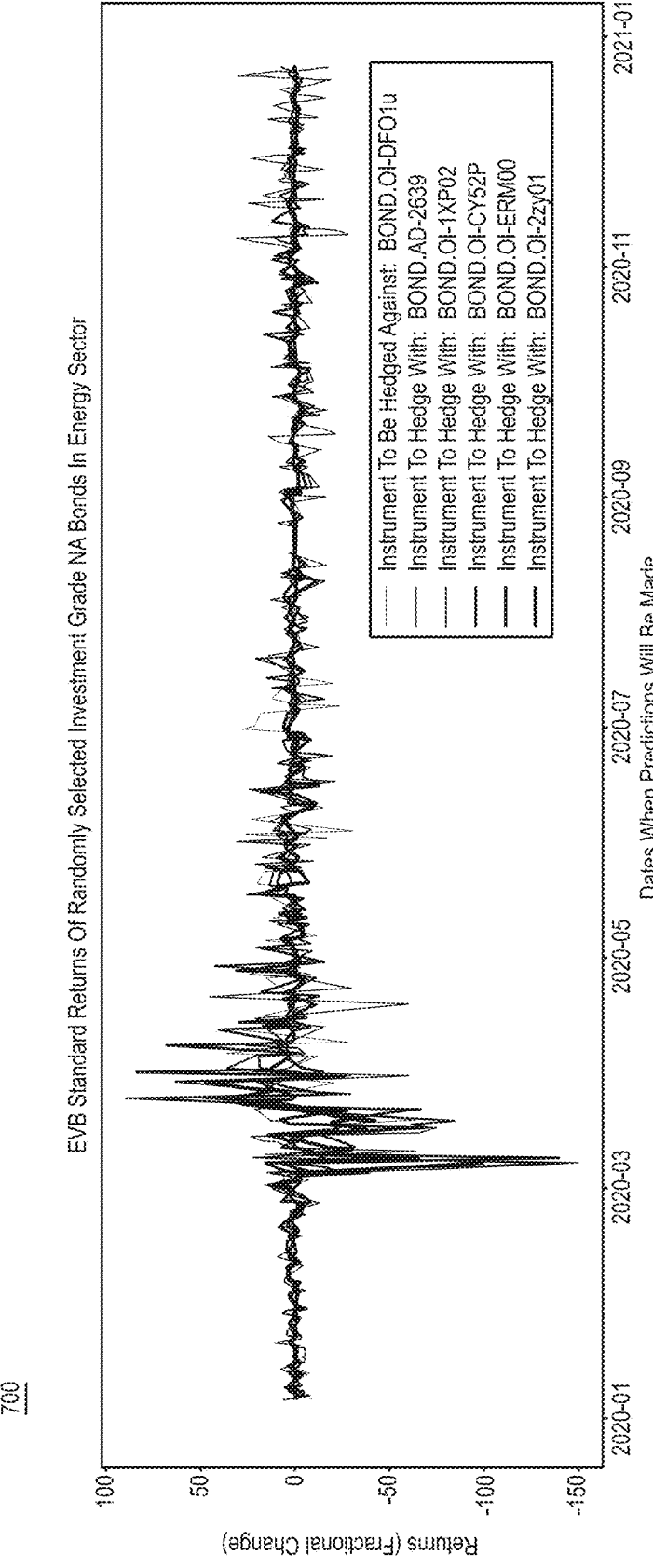
FIG. 7 is a set of graphs that illustrates a set of examples of bond returns to be potentially used for hedging, according to an exemplary embodiment.

Examples of hedge ratios: In an exemplary embodiment, the model aims to provide the terms needed to compute an optimal hedge ratio. FIG. 7 is a set of graphs 700 that illustrates a set of examples of bond returns to be potentially used for hedging, according to an exemplary embodiment.

FIG. 7 shows six (6) different bonds randomly sampled from the Energy sector from an IHS MarkIT Bond Pricing dataset. For demonstration purposes, it is assumed that the instrument being hedged against is the first bond in the list at the bottom right of the drawing (BOND.Yj-1dx06), and the other five bonds in the drawing are potential candidates to be used to hedge against it.

Figure 8:
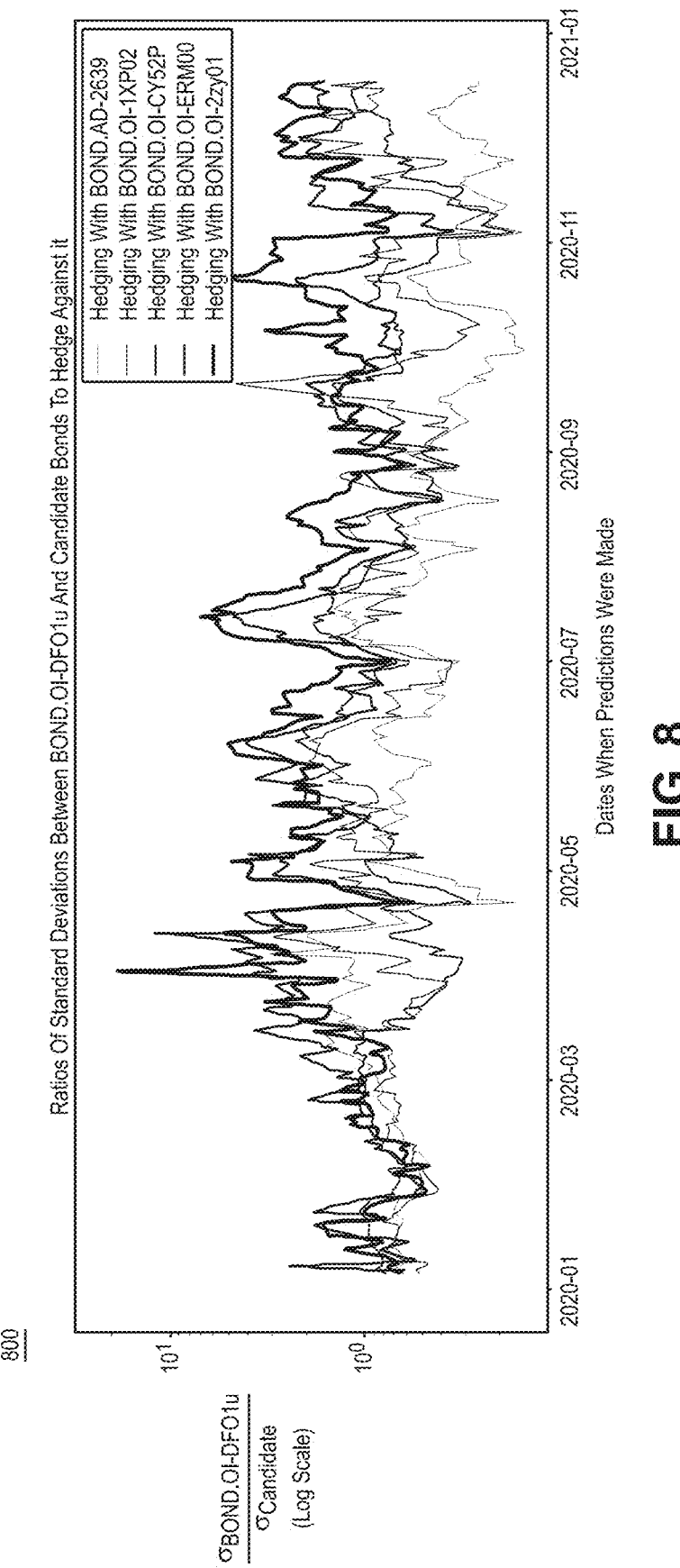
FIG. 8 is a set of graphs that illustrates volatility ratios that correspond to the bond returns of FIG. 7, according to an exemplary embodiment.

This hedge ratio term depends on the volatility of the instrument to be hedged against, $\sigma_{\Delta s}$, and of the instrument to be used to hedge with, $\sigma_{\Delta f}$. Next, it is noted that the hedge ratio equation $$h = \rho_t \frac{\sigma_{\Delta s}}{\sigma_{\Delta f}}$$

shows that the hedge ratio h is a function of the correlation matrix ρ and the ratio of standard deviation terms that relate to the volatility of the instrument to be hedged against, $\sigma_{\Delta s}$, and of each candidate instrument to be used to hedge with $\sigma_{\Delta f}$. These are shown in FIG. 8, which is a set of graphs 800 that illustrates volatility ratios that correspond to the bond returns of FIG. 7, according to an exemplary embodiment.

With these volatility ratios, as well as the correlation matrix p computed from our the GARCH model, a comparison can be made between what the hedge ratio looks like from covariance terms estimated using the model, versus covariance terms estimated using PCA or the second moment. The hedge ratios are computed in FIGS. 9, 10, 11, 12, and 13 for each respective one of the five candidate bonds used to hedge against bond BOND.Yj-1dx06.

Figure 9:
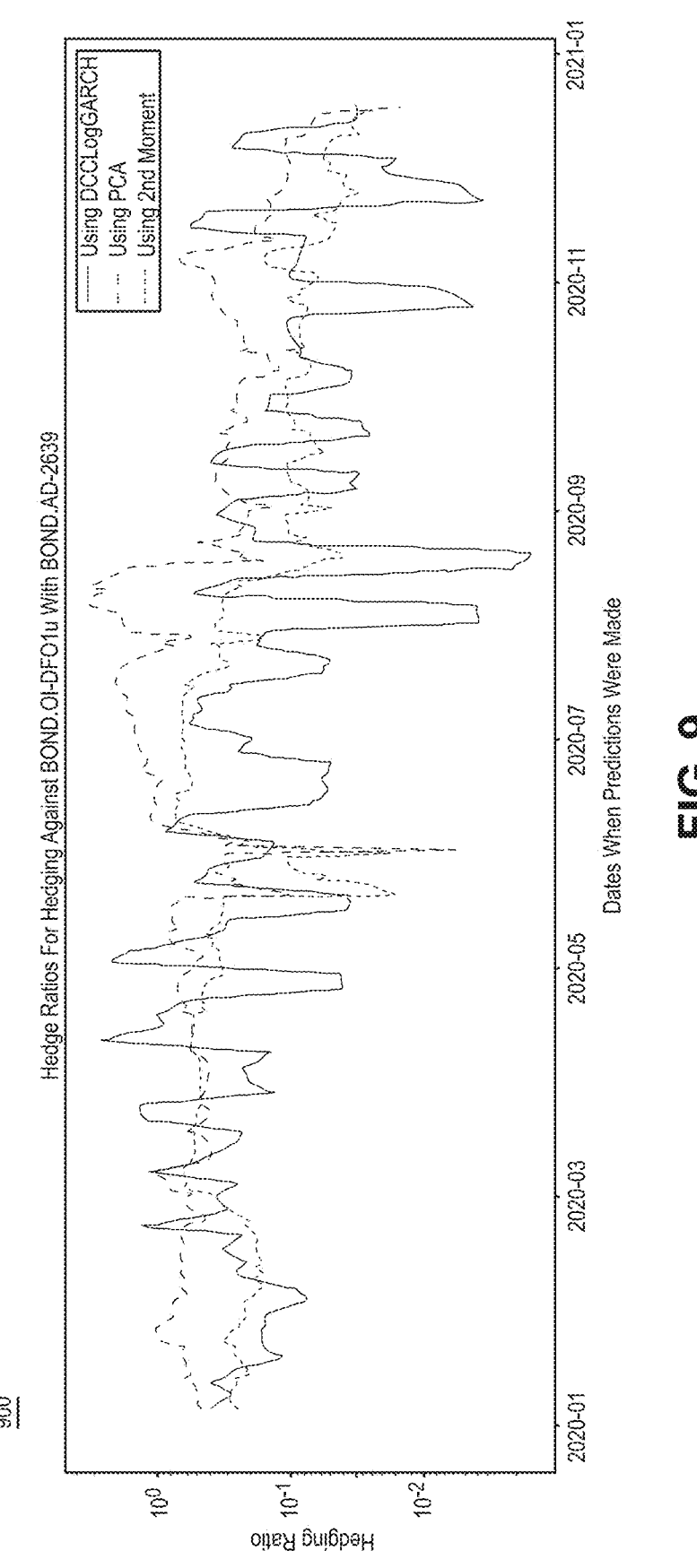
FIG. 9 is a set of graphs that illustrates hedge ratios of a first bond against a predetermined bond to be hedged against, according to an exemplary embodiment.
Figure 10:
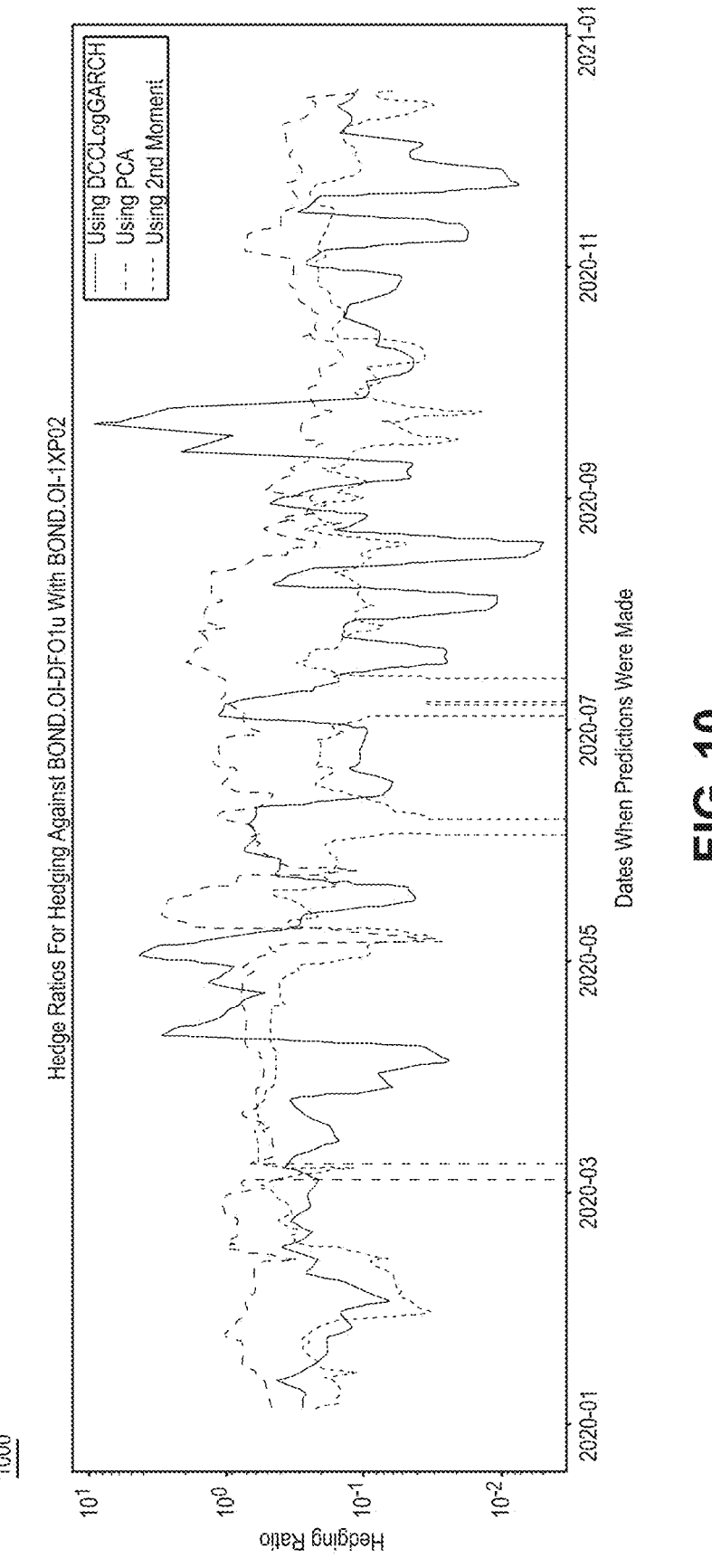
FIG. 10 is a set of graphs that illustrates hedge ratios of a second bond against the predetermined bond to be hedged against, according to an exemplary embodiment.
Figure 11:
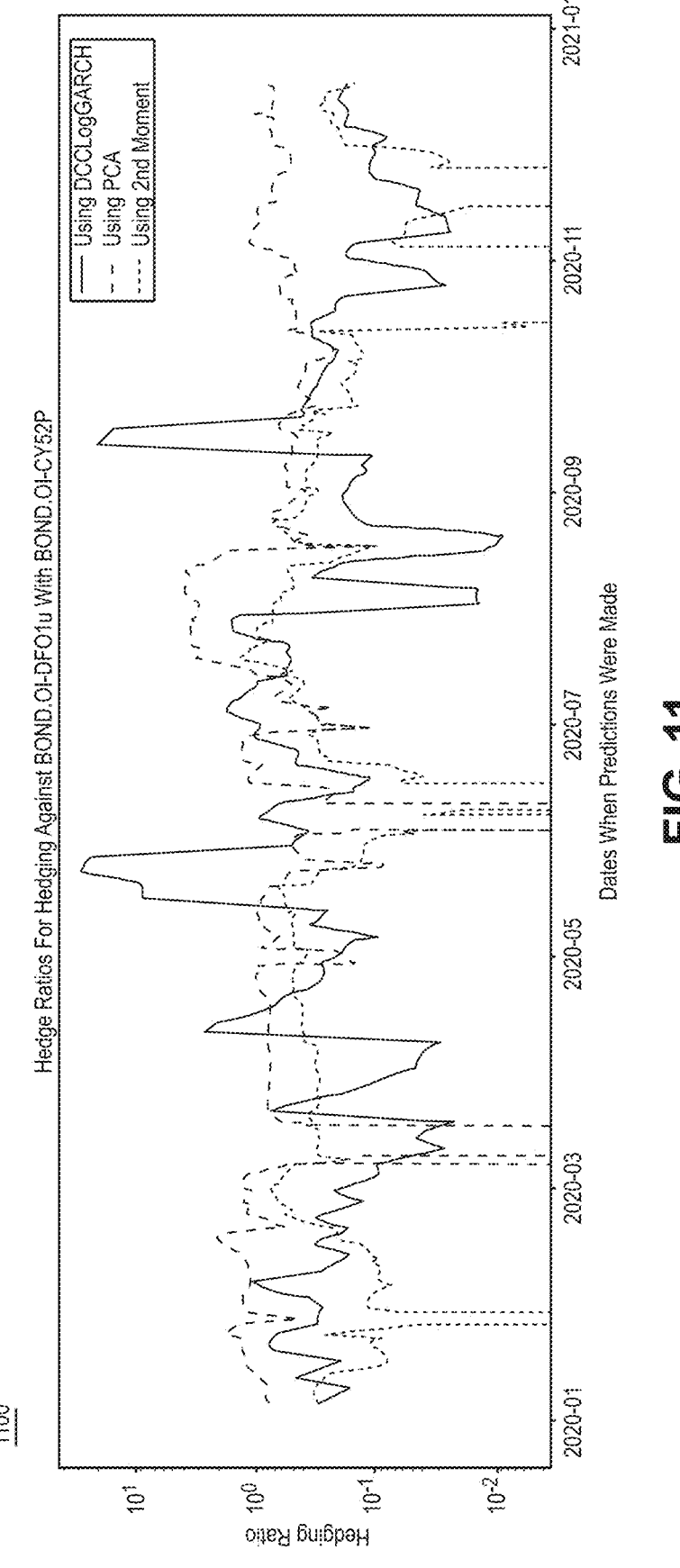
FIG. 11 is a set of graphs that illustrates hedge ratios of a third bond against the predetermined bond to be hedged against, according to an exemplary embodiment.
Figure 12:
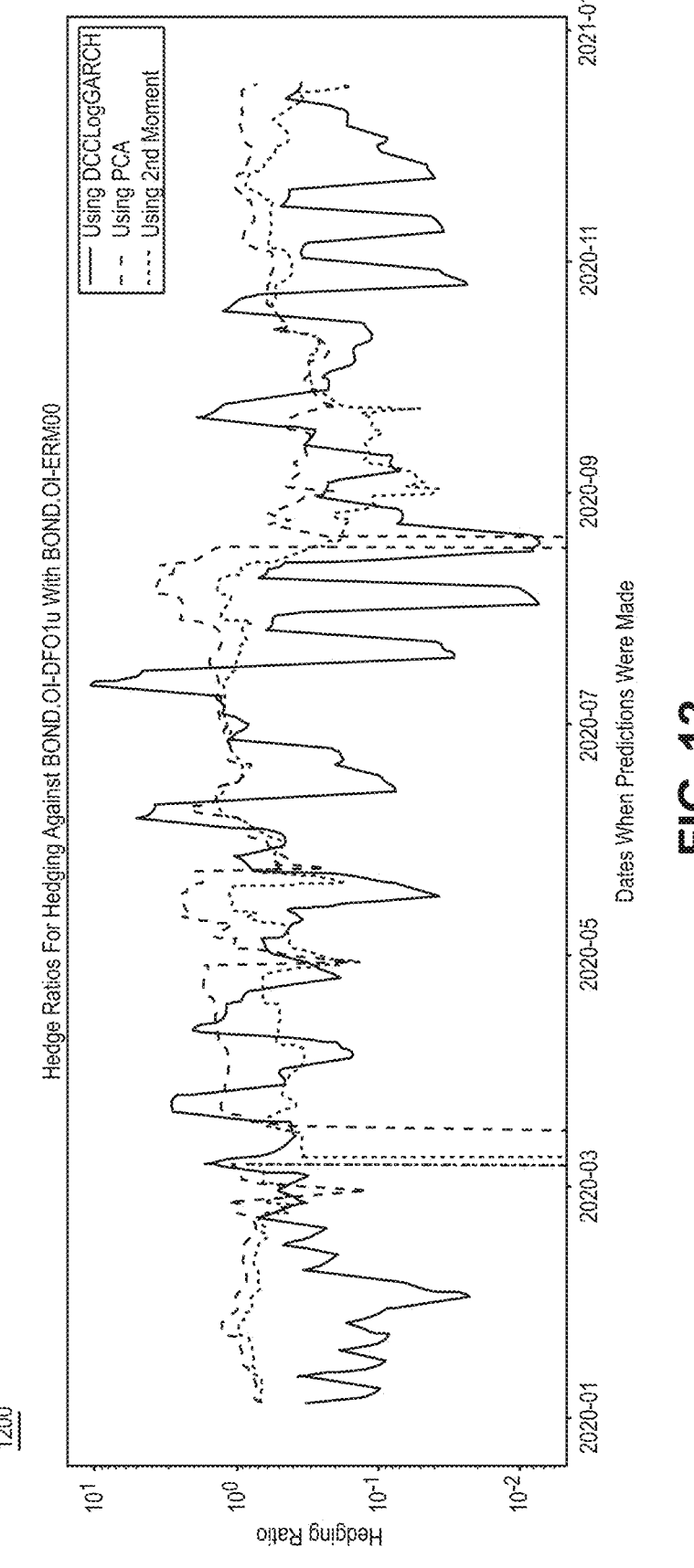
FIG. 12 is a set of graphs that illustrates hedge ratios of a fourth bond against the predetermined bond to be hedged against, according to an exemplary embodiment.
Figure 13:
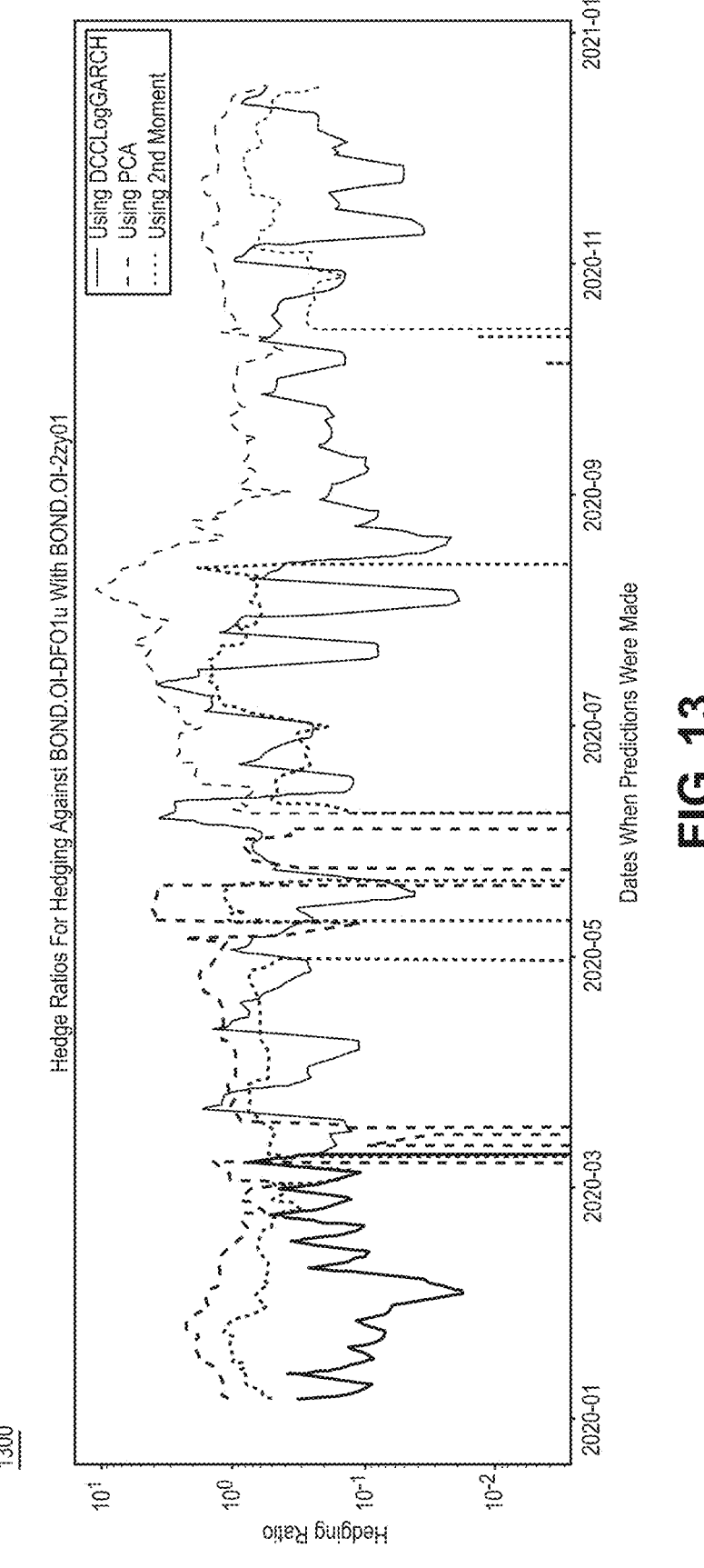
FIG. 13 is a set of graphs that illustrates hedge ratios of a fifth bond against the predetermined bond to be hedged against, according to an exemplary embodiment.

FIG. 9 is a set of graphs 900 that illustrates hedge ratios of a first bond against a predetermined bond to be hedged against, according to an exemplary embodiment. FIG. 10 is a set of graphs 1000 that illustrates hedge ratios of a second bond against the predetermined bond to be hedged against, according to an exemplary embodiment. FIG. 11 is a set of graphs 1100 that illustrates hedge ratios of a third bond against the predetermined bond to be hedged against, according to an exemplary embodiment. FIG. 12 is a set of graphs 1200 that illustrates hedge ratios of a fourth bond against the predetermined bond to be hedged against, according to an exemplary embodiment. FIG. 13 is a set of graphs 1300 that illustrates hedge ratios of a fifth bond against the predetermined bond to be hedged against, according to an exemplary embodiment.

In an exemplary embodiment, the hedge ratios computed using the model appear to very different from those computed using PCA or the second moment, the latter two of which appear less stable. In some cases, the differences are very large, as emphasized by the logarithmic scale, and so would influence the risk in an investment portfolio.

There may be a question regarding how an accuracy of the hedge ratios estimated by the model versus those calculated by using conventional models. In this aspect, the true hedge ratio is not known. Estimation of the true hedge ratio is difficult, with the need to have a good way to empirically estimate the actual covariance of the bond returns. This might be very noisy, and the estimated true hedge ratio may fluctuate widely and require some smoothing.

In an exemplary embodiment, to solve this problem, a methodology is proposed that serves as a proxy for finding the difference between the model hedge ratio and the true hedge ratios. This proxy is in the form of the L1 norm of the difference between the predicted covariance matrix and the empirical estimate of the true covariance matrix.

Comparing true versus predicted covariance matrices: At any future time t+s, the vector of bond returns in our dataset $y_{t+s}$ may be represented as:

$$y_{t+s}=a'+b'y_t+c_0'\epsilon_t+c_1'\epsilon_{t+1}+c_2'\epsilon_{t+2}+c_3'\epsilon_{t+3}+ \ldots +c_{s-1}'\epsilon_{t+s-1}+\epsilon_{t+s}.$$

Therefore, the covariance matrix for $y_{t+s}$ is $$c_1'H_{t+1}c_1'+ \ldots +c_{s-1}H_{t+s-1}c_{s-1}+H_{t+s}$$

To obtain the estimation for $H_{t+1}$ to $H_{t+s}$, Monte Carlo simulations may be used to obtain samples for $\{\sigma_{t+i}\}_{i=1}^{s}$ and $\{R_{t+i}\}_{i=1}^{s}$ according to Equations 2 and 3 above, and then $\{H_{t+i}\}_{i=1}^{s}$ may be computed by using the mean of samples as the estimator.

The estimated covariances may then be compared against the true covariance. In this aspect, the true covariance cannot be observed directly because there is just one realized $y_t$ for each t and the computation for covariance needs multiple samples. However, a model-based proxy for the true covariance may be used based on the following.

This true covariance proxy is computed at some future time t+s, where s is the number of days that are predicted into the future. This proxy is defined as the covariance between the epsilons predicted at future time t+s, conditioned on knowing the historic bond returns up to time t+s, and the maximum likelihood estimated parameters for time t. For example, with a new observation $y_{t+1}$, it is possible to compute $\epsilon_{t+1}=y_{t+1}-a_0-a_1y_t$, where $a_0$ and $a_1$ are estimated from the past history $\{y_i\}_{i=0}^{t}$ using the proposed model, and the proxy for covariance is $\epsilon_{t+1}\epsilon_{t+1}^{T}$. This proxy is approximate as this proxy reflected the random part that cannot be hedged based on the DCC model, and hence it can provide a benchmark for comparison.

For the weekly prediction and comparison, the predicted covariance matrix and proxy for true covariance are aggregated from daily predictions and daily proxy, respectively, by a linear combination given as Equation 12 below. Specifically, the covariance for the weekly return $\Sigma_{i=1}^{5}y_{t+i}$ is given by the following:

$$H_{t+5}+[(b+c)+1]^2H_{t+4}+[b(b+c)+(b+c)+1]^2H_{t+3}+ \ldots \\ +[b^3(b+c)+ \ldots +1]^2H_{t-1},$$

<div align="right">Equation 12:</div> which is used to aggregate both the predicted covariance and the proxy for the true covariance.

Figure 14:
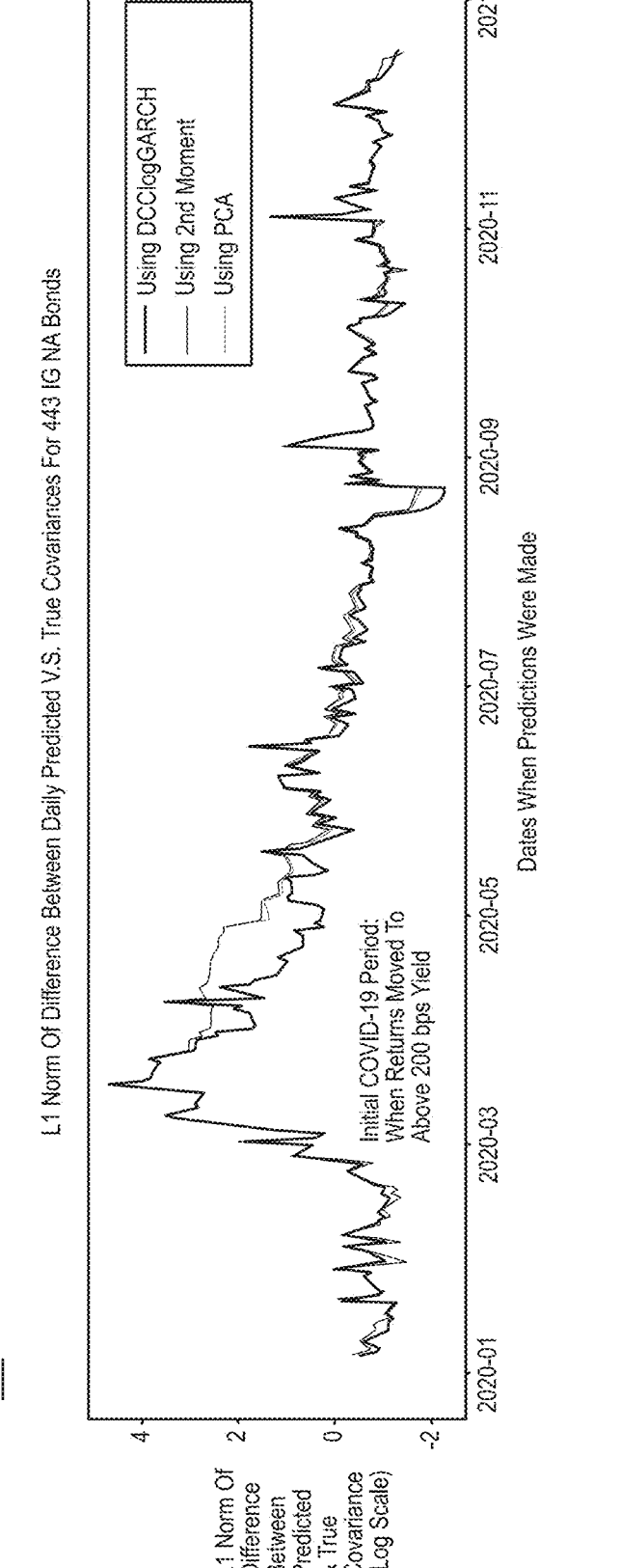
FIG. 14 is a set of graphs that illustrates a comparison between an L1 norm of a predicted covariance matrix and an estimation of a true covariance matrix for a daily granularity of historical bond market data, according to an exemplary embodiment.
Figure 15:
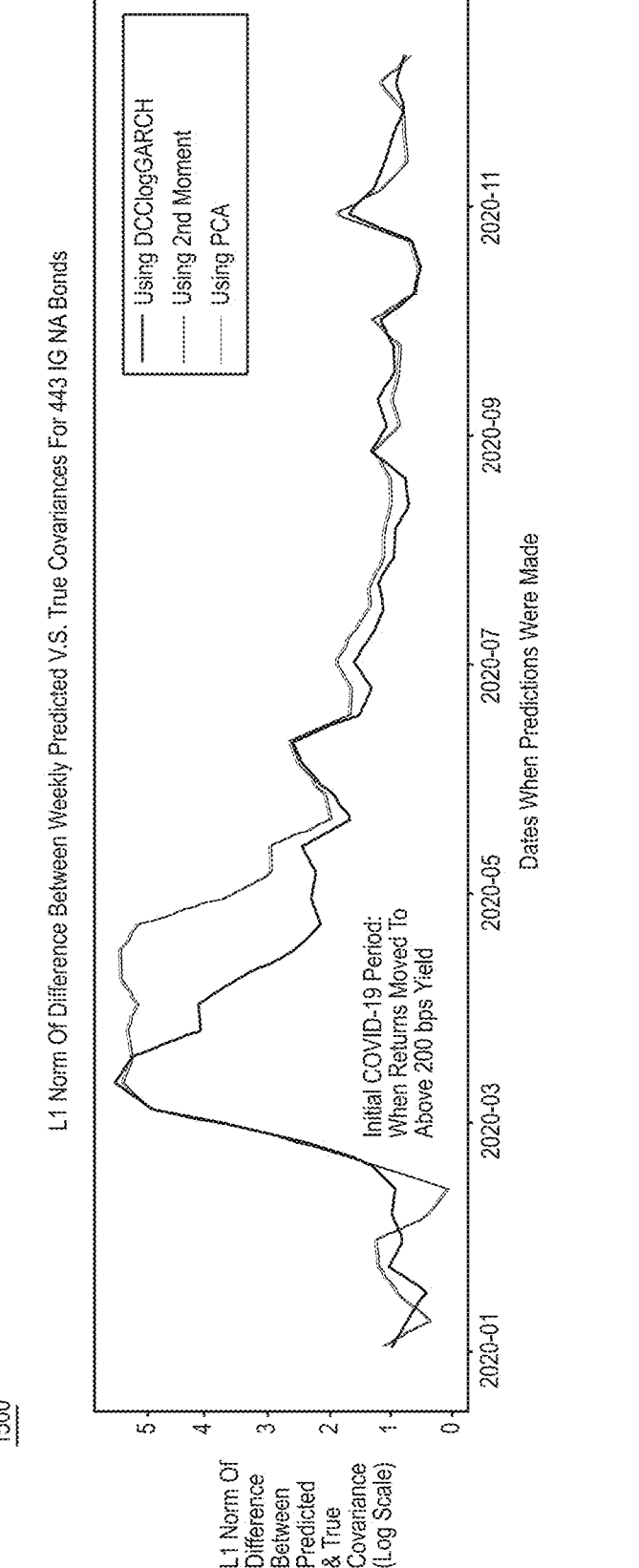
FIG. 15 is a set of graphs that illustrates a comparison between an L1 norm of a predicted covariance matrix and an estimation of a true covariance matrix for a weekly granularity of historical bond market data, according to an exemplary embodiment.
Figure 17:
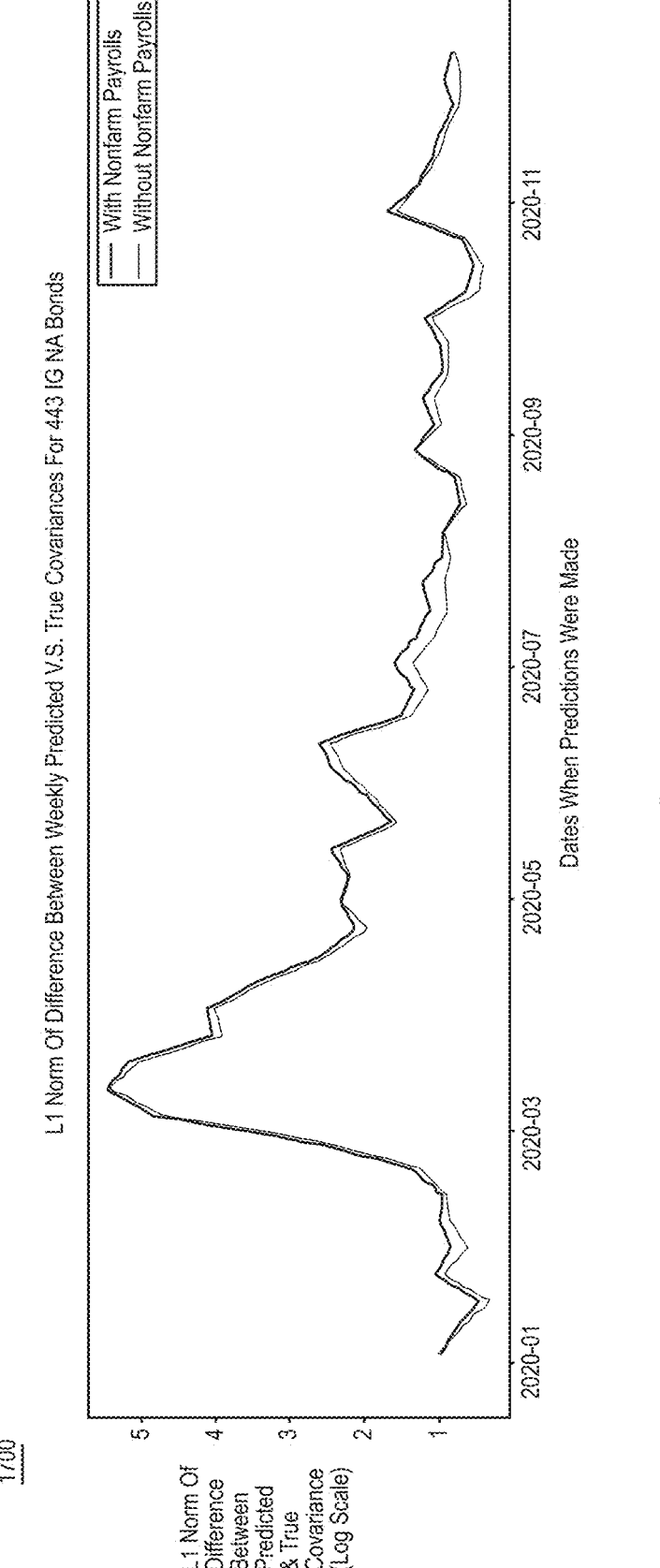
FIG. 17 is a set of graphs that illustrates a comparison between an L1 norm of a predicted covariance matrix and an L1 norm of a true covariance matrix for historical bond market data with seasonal and non-season payroll data taken into account, according to an exemplary embodiment.

FIG. 14 is a set of graphs 1400 that illustrates a comparison between an L1 norm of a predicted covariance matrix and an estimation of a true covariance matrix for a daily granularity of historical bond market data, according to an exemplary embodiment. FIG. 15 is a set of graphs 1500 that illustrates a comparison between an L1 norm of a predicted covariance matrix and an estimation of a true covariance matrix for a weekly granularity of historical bond market data, according to an exemplary embodiment. FIG. 16 is a set of graphs 1600 that illustrates a comparison between an L1 norm of a predicted covariance matrix and an L1 norm of a true covariance matrix for historical bond market data, according to an exemplary embodiment. FIG. 17 is a set of graphs 1700 that illustrates a comparison between an L1 norm of a predicted covariance matrix and an L1 norm of a true covariance matrix for historical bond market data with seasonal and non-season payroll data taken into account, according to an exemplary embodiment.

In an exemplary embodiment, with the estimated proxies for the true covariance, a comparison may be made as to how close the predicted covariance matrices are to the true covariance, where the predicted covariance matrices are generated by the model, by PCA and by the second moment. This can be seen in FIG. 14 for daily data and in FIG. 15 for weekly data.

One might see some profound structure in the L1 norms in FIGS. 14 and 15. Referring also to FIG. 16, by separating out the predicted covariance versus estimation of the true covariance and by computing their norms separately, there are two observations: First, the L1 norm of the predicted covariance is much lower than that of the estimated true covariance, where the underestimation of the true covariance matrix is more profound during the first half of 2020. This can be understood by the model being trained on stable data with minimal influence by COVID related events, and thus the covariance of the bond returns are generally predicted to be smaller. Second, the structure of the curves of the predicted and true covariance norms are similar, but one appears to offset the other by a small lag. This lag can be understood by the model having moving-average terms, thus resulting in some structure in the net difference between the two curves, especially noticeable right before September 2020.

Predicting with seasonal data: In an exemplary embodiment, in addition to bond returns, the model incorporates external data into the GARCH equations that might influence the volatility of the bond returns. This external data can be seasonal events, like non-farm payrolls, or endogeneous terms like leverage terms, bond liquidity, time to maturity, or credit rating. FIG. 17 shows the L1 norm between predicted versus empirical estimations of the true covariance matrix, with and without seasonal data, for the year 2020.

In this period, it appears that there is not much difference with or without non-farm payrolls. This may be explained in two ways: First, the predictions are made for a very volatile period when other factors influenced by larger events, such as COVID, would overshadow the effects of the non-farm payrolls. Second, as the model was trained only on historical seasonal data and none during the time being predicted, the input data for our predictions would be the same, but the estimated parameters that use this data to predict the covariances would be different.

Accordingly, with this technology, an optimized process for implementing methods and systems for providing a model for fast-changing, time-dynamic, asset-agnostic covariance matrix estimation to be used for hedging large baskets of securities is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for estimating a covariance with respect to a plurality of bonds, the method being implemented by at least one processor, the method comprising:

receiving, by the at least one processor, first information that relates to historical bond market data;

using a first algorithm based on an Auto-Regressive-Moving-Average (ARMA) model to calculate a set of regression errors based on a first period of the historical bond market data;

using a second algorithm based on a logarithmic Generalized AutoRegressive Conditional Heteroskedasticity (GARCH) model to calculate an estimated volatility vector based on the first period of the historical bond market data;

using the calculated set of regression errors and the calculated volatility vector to estimate a time-varying covariance matrix of the set of regression errors with respect to the first period of the historical bond market data;

combining the estimated time-covariance matrix of the regression errors and the calculated volatility vector to estimate a time-varying covariance matrix of the bond returns for the first period of the historical bond market data;

projecting the estimated time-varying covariance matrix of the bond returns onto another estimated time-varying covariance matrix of the bond returns for a second period of the historical bond market data, wherein the second period is at least six times longer than the first period, wherein the second period overlaps the first period, and wherein the second period is at most two years;

using the estimated time-varying covariance matrix of the bond returns that has been projected to calculate a set of predicted hedge ratios; and displaying, on a user interface, a result of the calculating of the predicted hedge ratios that includes a respective graph of a fractional change in a corresponding return of each of a first instrument against which a hedge is to be made and a plurality of candidate instruments to be used for hedging as a function of a prediction date, wherein the using of the first algorithm based on the ARMA model to calculate the set of regression errors based on the first period of the historical bond market data comprises:

using an ordinary least squares technique with respect to a first subset of the bond market data to estimate respective values of at least two parameters of the first algorithm;

training the ARMA model based on a second subset of the bond market data that corresponds to a predetermined training interval;

adjusting the estimated respective values of the at least two parameters based on a result of the training;

receiving third information that relates to bond market data corresponding to a next predetermined time interval that occurs after the predetermined training interval;

retraining the ARMA model based on the third information; and readjusting the estimated respective values of the at least two parameters based on a result of the retraining.

2. The method of claim 1, wherein each of the ARMA model and the GARCH model is based on vectorized parameters that are derived from the historical bond market data.

3. The method of claim 1, further comprising:

receiving, by the at least one processor, second information that relates to seasonal payroll data; and adjusting at least one from among the set of regression errors based on the second information.

4. The method of claim 1, wherein the historical bond market data includes historical price data that relates to at least 1000 different bonds and that is less than two years old.

5. The method of claim 1, further comprising displaying, on the user interface, a graph of ratios of standard deviations between the first instrument and each of the plurality of candidate instruments.

6. The method of claim 1, further comprising displaying, on the user interface, a graph of a hedge ratio of at least one of the plurality of candidate instruments with respect to the first instrument as a function of the prediction date.

7. A computing apparatus for estimating a covariance with respect to a plurality of bonds, the computing apparatus comprising:

a processor;

a display device;

a memory; and a communication interface coupled to each of the processor, the display device, and the memory, wherein the processor is configured to:

receive, via the communication interface, first information that relates to historical bond market data;

use a first algorithm based on an Auto-Regressive-Moving-Average (ARMA) model to calculate a set of regression errors based on a first period of the historical bond market data;

use a second algorithm based on a logarithmic Generalized AutoRegressive Conditional Heteroskedasticity (GARCH) model to calculate an estimated volatility vector based on the first period of the historical bond market data;

use the calculated set of regression errors and the calculated volatility vector to estimate a time-varying covariance matrix of the set of regression errors with respect to the first period of the historical bond market data;

combine the estimated time-covariance matrix of the ARMA model regression errors and the calculated volatility vector to estimate a time-varying covariance matrix of the bond returns for the first period of the historical bond market data;

project the estimated time-varying covariance matrix of the bond returns onto another estimated time-varying covariance matrix of the bond returns for a second period of the historical bond market data, wherein the second period is at least six times longer than the first period, wherein the second period overlaps the first period, and wherein the second period is at most two years;

use the estimated time-varying covariance matrix of the bond returns that has been projected to calculate a set of predicted hedge ratios; and display, on a user interface of the display device, a result of the calculating of the predicted hedge ratios that includes a respective graph of a fractional change in a corresponding return of each of a first instrument against which a hedge is to be made and a plurality of candidate instruments to be used for hedging as a function of a prediction date, wherein the processor is further configured to use the first algorithm based on the ARMA model to calculate the set of regression errors based on the first period of the historical bond market data by:

using an ordinary least squares technique with respect to a first subset of the bond market data to estimate respective values of at least two parameters of the first algorithm;

training the ARMA model based on a second subset of the bond market data that corresponds to a predetermined training interval;

adjusting the estimated respective values of the at least two parameters based on a result of the training;

receiving, via the communication interface, third information that relates to bond market data corresponding to a next predetermined time interval that occurs after the predetermined training interval;

retraining the ARMA model based on the third information; and readjusting the estimated respective values of the at least two parameters based on a result of the retraining.

8. The computing apparatus of claim 7, wherein each of the ARMA model and the GARCH model is based on vectorized parameters that are derived from the historical bond market data.

9. The computing apparatus of claim 7, wherein the processor is further configured to:

receive, via the communication interface, second information that relates to seasonal payroll data; and adjust at least one from among the set of regression errors based on the second information.

10. The computing apparatus of claim 7, wherein the historical bond market data includes historical price data that relates to at least 1000 different bonds and that is less than two years old.

11. The computing apparatus of claim 7, wherein the processor is further configured to display, on the user interface of the display device, a graph of ratios of standard deviations between the first instrument and each of the plurality of candidate instruments.

12. The computing apparatus of claim 7, wherein the processor is further configured to display, on the user interface of the display device, a graph of a hedge ratio of at least one of the plurality of candidate instruments with respect to the first instrument as a function of the prediction date.

13. A non-transitory computer readable storage medium storing instructions for estimating a covariance with respect to a plurality of bonds, the storage medium comprising executable code which, when executed by at least one processor, causes the at least one processor to:

receive first information that relates to historical bond market data;

use a first algorithm based on an Auto-Regressive-Moving-Average (ARMA) model to calculate a set of regression errors based on a first period of the historical bond market data;

use a second algorithm based on a logarithmic Generalized AutoRegressive Conditional Heteroskedasticity (GARCH) model to calculate an estimated volatility vector based on the first period of the historical bond market data;

use the calculated set of regression errors and the calculated volatility vector to estimate a time-varying covariance matrix of a set of regression errors with respect to the first period of the historical bond market data;

combine the estimated time-covariance matrix of the ARMA model regression errors and the calculated volatility vector to estimate a time-varying covariance matrix of the bond returns for the first period of the historical bond market data;

project the estimated time-varying covariance matrix of the bond returns onto another estimated time-varying covariance matrix of the bond returns for a second period of the historical bond market data, wherein the second period is at least six times longer than the first period, wherein the second period overlaps the first period, and wherein the second period is at most two years;

use the estimated time-varying covariance matrix of the bond returns that has been projected to calculate a set of predicted hedge ratios; and display, on a user interface, a result of the calculating of the predicted hedge ratios that includes a respective graph of a fractional change in a corresponding return of each of a first instrument against which a hedge is to be made and a plurality of candidate instruments to be used for hedging as a function of a prediction date, wherein the executable code causes the at least one processor to perform the use of the first algorithm based on the ARMA model to calculate the set of regression errors based on the first period of the historical bond market data by:

using an ordinary least squares technique with respect to a first subset of the bond market data to estimate respective values of at least two parameters of the first algorithm;

training the ARMA model based on a second subset of the bond market data that corresponds to a predetermined training interval;

adjusting the estimated respective values of the at least two parameters based on a result of the training;

receiving third information that relates to bond market data corresponding to a next predetermined time interval that occurs after the predetermined training interval;

retraining the ARMA model based on the third information; and readjusting the estimated respective values of the at least two parameters based on a result of the retraining.

14. The storage medium of claim 13, wherein each of the ARMA model and the GARCH model is based on vectorized parameters that are derived from the historical bond market data.

* * * * *